(12) United States Patent
Wan et al.

(10) Patent No.: US 10,998,751 B2
(45) Date of Patent: May 4, 2021

(54) WIRELESS CHARGING SYSTEM, WIRELESS CHARGING DEVICE, WIRELESS CHARGING METHOD, AND DEVICE TO BE CHARGED

(71) Applicant: GUANGDONG OPPO MOBILE TELECOMMUNICATIONS CORP., LTD., Guangdong (CN)

(72) Inventors: Shiming Wan, Guangdong (CN); Jialiang Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 55 days.

(21) Appl. No.: 16/240,862

(22) Filed: Jan. 7, 2019

(65) Prior Publication Data

US 2019/0140470 A1 May 9, 2019

Related U.S. Application Data

(63) Continuation of application No. PCT/CN2017/079784, filed on Apr. 7, 2017.

(51) Int. Cl.
*H02J 7/02* (2016.01)
*H02J 50/10* (2016.01)
(Continued)

(52) U.S. Cl.
CPC .............. *H02J 7/025* (2013.01); *H02J 5/005* (2013.01); *H02J 7/00* (2013.01); *H02J 7/0026* (2013.01);
(Continued)

(58) Field of Classification Search
CPC ...................................... H02J 7/00; H02J 7/02
See application file for complete search history.

(56) References Cited

U.S. PATENT DOCUMENTS 5,808,447 A 9/1998 Hagino
6,329,786 B1 12/2001 Willis et al.
(Continued)

FOREIGN PATENT DOCUMENTS

CN 2464002 12/2001
CN 102013717 4/2011
(Continued)

OTHER PUBLICATIONS

EPO, Office Action for EP Application No. 17904431.8, dated Sep. 26, 2019.
(Continued)

*Primary Examiner* — Robert Grant
(74) *Attorney, Agent, or Firm* — Hodgson Russ LLP

(57) ABSTRACT

Provided are a wireless charging system, device, and method and a device to be charged. The wireless charging system includes the wireless charging device and the device to be charged. The wireless charging device includes a wireless transmitter circuit and a first communication control circuit. The device to be charged includes a battery, a wireless receiver circuit, a first charging channel, a detection circuit and a second communication control circuit. The second communication control circuit is configured to perform wireless communication with the first communication control circuit based on the output voltage and/or the output current of the wireless receiver circuit detected by the detection circuit, such that the first communication control circuit adjusts a transmitting power of the wireless transmitter circuit, to enable the output voltage and/or the output current of the wireless receiver circuit to match a charging stage where the battery presently is.

25 Claims, 6 Drawing Sheets

(51) Int. Cl.
| | |
|---|---|
| *H02J 7/00* | (2006.01) |
| *H02J 50/80* | (2016.01) |
| *H02M 3/07* | (2006.01) |
| *H04B 5/00* | (2006.01) |
| *H02J 5/00* | (2016.01) |
| *H02J 50/12* | (2016.01) |
| *H02J 7/04* | (2006.01) |

(52) U.S. Cl.
CPC ............ *H02J 7/0044* (2013.01); *H02J 7/045* (2013.01); *H02J 50/10* (2016.02); *H02J 50/12* (2016.02); *H02J 50/80* (2016.02); *H02M 3/07* (2013.01); *H04B 5/0037* (2013.01); *H04B 5/0075* (2013.01); *H02J 2207/20* (2020.01); *Y02B 40/00* (2013.01)

(56) References Cited

U.S. PATENT DOCUMENTS

| | | | |
|---|---|---|---|
| 2012/0300413 | A1 | 11/2012 | Iida |
| 2013/0033235 | A1 | 2/2013 | Fukaya |
| 2013/0285604 | A1* | 10/2013 | Partovi ............... H04B 5/0093 320/108 |
| 2014/0191568 | A1* | 7/2014 | Partovi .................. H02J 7/025 307/9.1 |
| 2014/0247052 | A1 | 9/2014 | Hada |
| 2014/0329472 | A1 | 11/2014 | Kovacs et al. |
| 2014/0379047 | A1 | 12/2014 | Meskens |
| 2015/0015180 | A1 | 1/2015 | Miller et al. |
| 2015/0214748 | A1 | 7/2015 | Lin et al. |
| 2015/0357851 | A1 | 12/2015 | Huang et al. |
| 2016/0006267 | A1 | 1/2016 | Muratov et al. |
| 2016/0020630 | A1 | 1/2016 | Tseng et al. |
| 2016/0049825 | A1 | 2/2016 | Green |
| 2016/0099601 | A1* | 4/2016 | Leabman ................ H02J 50/40 307/104 |
| 2016/0320867 | A1 | 11/2016 | Chan et al. |
| 2016/0355095 | A1 | 12/2016 | Okamoto |
| 2016/0380467 | A1* | 12/2016 | Shao .................... H04B 5/0037 320/108 |
| 2017/0033590 | A1 | 2/2017 | Lee et al. |
| 2018/0115179 | A1 | 4/2018 | Fan et al. |

FOREIGN PATENT DOCUMENTS

| | | |
|---|---|---|
| CN | 103036282 | 4/2013 |
| CN | 202998182 | 6/2013 |
| CN | 103944243 | 7/2014 |
| CN | 104283293 | 1/2015 |
| CN | 104467130 | 3/2015 |
| CN | 104600869 | 5/2015 |
| CN | 104617632 | 5/2015 |
| CN | 104752046 | 7/2015 |
| CN | 105098900 | 11/2015 |
| CN | 105148402 | 12/2015 |
| CN | 105226779 | 1/2016 |
| CN | 105337384 | 2/2016 |
| CN | 104283293 | 6/2016 |
| CN | 205355893 | 6/2016 |
| CN | 105826066 | 8/2016 |
| CN | 106026237 | 10/2016 |
| CN | 106169798 | 11/2016 |
| CN | 106451705 | 2/2017 |
| EP | 2590300 | 5/2013 |
| EP | 2824797 | 1/2015 |
| EP | 3113329 | 1/2017 |
| EP | 3133746 | 2/2017 |
| JP | H09121462 | 5/1997 |
| JP | 2000333377 | 11/2000 |
| JP | 2007288889 | 11/2007 |
| JP | 2009504117 | 1/2009 |
| JP | 2011034306 | 2/2011 |
| JP | 2011120361 | 6/2011 |
| JP | 2012249410 | 12/2012 |
| JP | 2013038854 | 2/2013 |
| JP | 2013115859 | 6/2013 |
| JP | 2013230007 | 11/2013 |
| JP | 2016015862 | 1/2016 |
| JP | 2016063725 | 4/2016 |
| JP | 2016063726 | 4/2016 |
| JP | 2016092986 | 5/2016 |
| JP | 2016123162 | 7/2016 |
| JP | 2016152722 | 8/2016 |
| JP | 2017046521 | 3/2017 |
| JP | 2017060328 | 3/2017 |
| KR | 100792311 | 1/2008 |
| KR | 20120092038 | 8/2012 |
| KR | 20130007985 | 1/2013 |
| KR | 20130023618 | 3/2013 |
| KR | 101270675 | 6/2013 |
| KR | 20130124698 | 11/2013 |
| KR | 101580342 | 12/2015 |
| KR | 101676591 | 11/2016 |
| KR | 20170007814 | 1/2017 |
| TW | 201145753 | 12/2011 |
| TW | 201533561 | 9/2015 |
| WO | 2014115193 | 7/2014 |
| WO | 2016074458 | 5/2016 |

OTHER PUBLICATIONS

TIPO, Office Action for TW Application No. 107112166, dated Jan. 4, 2019.
EPO, Office Action for EP Application No. 17904556, dated Apr. 5, 2019.
WIPO, ISR for PCT/CN2018/081963, dated Jul. 11, 2018.
WIPO, ISR for PCT/CN2018/081962, dated Jun. 29, 2018.
WIPO, ISR for PCT/CN2017/085990, dated Jan. 15, 2018.
WIPO, ISR for PCT/CN2017/079784, dated Dec. 4, 2017.
EPO, Office Action for EP Application No. 17904431.8, dated Jun. 16, 2020.
JPO, Office Action for JP Application No. 2019-514267, dated May 29, 2020.
KIPO, Office Action for KR Application No. 10-2019-7007549, dated Mar. 26, 2020.
IPO, Office Action for IN Application No. 201917008151, dated Jun. 12, 2020.
EPO, Office Action for EP Application No. 17904556.2, dated May 4, 2020.
Li et al., "The effects of pulse charging on cycling characteristics of commercial lithium-ion batteries," Journal of Power Sources, 2001, vol. 102, pp. 302-309.
EPO, Communication for EP Application No. 17904556.2, dated Sep. 14, 2020.
IPI, Office Action for IN Application No. 201917009580, dated Jul. 21, 2020.
KIPO, Office Action for KR Application No. 10-2019-7030041, dated Sep. 18, 2020.
JPO, Office Action for JP Application No. 2019-514267, dated Aug. 7, 2020.
JPO, Office Action for JP Application No. 2019-543900, dated Sep. 15, 2020.
JPO, Office Action for JP Application No. 2019-539764, dated Sep. 1, 2020.
KIPO, Office Action for KR Application No. 10-2019-7026966, dated Aug. 18, 2020.
KIPO, Second Office Action for KR Application No. 10-2019-7007549, dated Aug. 7, 2020.
JPO, Office Action for JP Application No. 2019-514267, dated Oct. 13, 2020.
KIPO, Third Office Action for KR Application No. 10-2019-7007549, dated Sep. 4, 2020.
EPO, Office Action for EP Application No. 17904431.8, dated Dec. 15, 2020.
EPO, Office Action for EP Application No. 17904556.2, dated Jan. 19, 2021.
EPO, Office Action for EP Application No. 18781860.4, dated Mar. 2, 2021.

(56) References Cited

OTHER PUBLICATIONS

Keil, Peter et al., "Charging protocols for lithium-ion batteries and their impact on cycle life— An experimental study with different 18650 high-power cells," Journal of Energy Storage 6, 2016, pp. 125-141.
SIPO, Decision on Rejection for CN Application No. 201780041786.3, dated Jan. 26, 2021.
KIPO, Office Action for KR Application No. 10-2019-7027259, dated Jan. 27, 2021.
KIPO, Notice of Allowance for KR Application No. 10-2019-7026966, dated Feb. 2, 2021.
USPTO, Office Action for U.S. Appl. No. 16/271,131, dated Jan. 25, 2021.
USPTO, Office Action for U.S. Appl. No. 16/238,162, dated Feb. 1, 2021.

\* cited by examiner the device to be charged performs wireless communication with the wireless charging device according to the output current and/or the output voltage of the wireless receiver circuit detected by the detection circuit, such that the wireless charging device adjusts a transmitting power of the wireless transmitter circuit, to enable the output voltage and/or the output current of the wireless receiver circuit to match a charging stage where the battery presently is — 910

Fig. 9 during the wireless charging, performing wireless communication with the device to be charged to adjust a transmitting power of the wireless transmitter circuit, such that an output voltage and/or an output current of a wireless receiver circuit in the device to be charged match a charging stage where a battery of the device to be charged presently is — 1010

Fig. 10 performing wireless communication with the wireless charging device according to the output voltage and/or the output current of the wireless receiver circuit detected by the detection circuit, to adjust a transmitting power of the wireless charging device, such that the output voltage and/or the output current of the wireless receiver circuit match a charging stage where the battery presently is — 1110

Fig. 11

WIRELESS CHARGING SYSTEM, WIRELESS CHARGING DEVICE, WIRELESS CHARGING METHOD, AND DEVICE TO BE CHARGED

CROSS-REFERENCE TO RELATED APPLICATIONS

This application is a continuation application of International Application No. PCT/CN2017/079784, filed on Apr. 7, 2017, the entire contents of which is incorporated herein by reference.

TECHNICAL FIELD

The present disclosure generally relates to a wireless charging technology field, and more particularly, to a wireless charging system, a wireless charging device, a wireless charging method and a device to be charged.

BACKGROUND

At present, in the charging technology field, a device to be charged is typically charged in a wired charging mode.

Taking a mobile phone as an example, the mobile phone is typically charged in a wired charging mode. In detail, when there is a need to charge the mobile phone, the mobile phone may be coupled with a power supply device via a charging cable (for example, a USB (universal serial bus) cable), and an output power of the power supply device may be transmitted to the mobile phone via the charging cable, to charge a battery in the mobile phone.

For the device to be charged, it needs to use the charging cable in the wired charging mode, which results in cumbersome operation in a charging preparation stage. Thus, a wireless charging mode has been favored more and more by people. However, the conventional wireless charging mode has a bad effect, and needs improvement.

SUMMARY

In an aspect, a wireless charging system is provided. The wireless charging system includes a wireless charging device and a device to be charged. The wireless charging device includes: a wireless transmitter circuit, configured to transmit an electromagnetic signal to perform wireless charging on the device to be charged; and a first communication control circuit, configured to perform wireless communication with the device to be charged during the wireless charging. The device to be charged includes: a battery; a wireless receiver circuit, configured to receive the electromagnetic signal, and to convert the electromagnetic signal to an output voltage and an output current of the wireless receiver circuit; a first charging channel, configured to receive the output voltage and the output current of the wireless receiver circuit, and to charge the battery based on the output voltage and the output current of the wireless receiver circuit; a detection circuit, configured to detect the output voltage and/or the output current of the wireless receiver circuit; and a second communication control circuit, configured to perform wireless communication with the first communication control circuit based on the output voltage and/or the output current of the wireless receiver circuit detected by the detection circuit, such that the first communication control circuit adjusts a transmitting power of the wireless transmitter circuit, to enable the output voltage and/or the output current of the wireless receiver circuit to match a charging stage where the battery presently is.

In another aspect, a wireless charging device is provided. The wireless charging device includes: a wireless transmitter circuit, configured to transmit an electromagnetic signal to perform wireless charging on a device to be charged; and a communication control circuit, configured to perform wireless communication with the device to be charged during the wireless charging to adjust a transmitting power of the wireless transmitter circuit, such that an output voltage and/or an output current of a wireless receiver circuit in the device to be charged match a charging stage in which a battery of the device to be charged presently is.

In another aspect, a device to be charged is provided. The device to be charged includes: a battery; a wireless receiver circuit, configured to receive an electromagnetic signal transmitted by a wireless charging device, and to convert the electromagnetic signal to an output current and an output voltage of the wireless receiver circuit; a first charging channel, configured to receive the output voltage and the output current of the wireless receiver circuit, and to charge the battery based on the output voltage and the output current of the wireless receiver circuit; a detection circuit, configured to detect the output voltage and/or the output current of the wireless receiver circuit; and a communication control circuit, configured to perform wireless communication with the wireless charging device based on the output voltage and/or the output current of the wireless receiver circuit detected by the detection circuit, to adjust a transmitting power of the wireless charging device, such that the output voltage and/or the output current of the wireless receiver circuit match a charging stage where the battery presently is.

In another aspect, a wireless charging method is provided. The wireless charging method is applicable to a device to be charged. The wireless charging method includes: receiving an electromagnetic signal sent by the wireless charging device; converting the electromagnetic signal to an output voltage and an output current, for charging a battery in the device to be charged based on the output voltage and the output current; detecting the output voltage and/or the output current; and performing wireless communication with the wireless charging device based on the output current and/or the output voltage detected, such that the wireless charging device adjusts a transmitting power of the electromagnetic signal, to enable the output voltage and/or the output current to match a charging stage where the battery presently is.

BRIEF DESCRIPTION OF THE DRAWINGS

FIG. 9 is a flow chart of a wireless charging method provided by an embodiment of the present disclosure.

FIG. 10 is a flow chart of a wireless charging method provided by another embodiment of the present disclosure.

FIG. 11 is a flow chart of a wireless charging method provided by yet another embodiment of the present disclosure.

DETAILED DESCRIPTION

In embodiments of the present disclosure, a device to be charged is charged based on a wireless charging technology, which can complete power transmission without a cable, simplifying operations in a charging preparation stage.

In the conventional wireless charging technology, a power supply device (for example, an adapter) is typically coupled with a wireless charging device (for example, a wireless charging base), and an output power of the power supply device is transmitted to the device to be charged in a wireless mode (for example, in a form of electromagnetic signal or electromagnetic wave) via the wireless charging device, to perform wireless charging on the device to be charged.

According to different wireless charging principles, the wireless charging mode can be implemented by magnetic coupling (or electromagnetic induction), magnetic resonance, and radio waves. At present, the mainstream wireless charging standards include a QI standard, a PMA (power matters alliance) standard, and an A4WP (alliance for wireless power). The QI standard and the PMA standard adopts the magnetic coupling for wireless charging. The A4WP standard adopts the magnetic resonance for wireless charging.

In the following, the conventional wireless charging mode is described with reference to FIG. 1.

Figure 1:
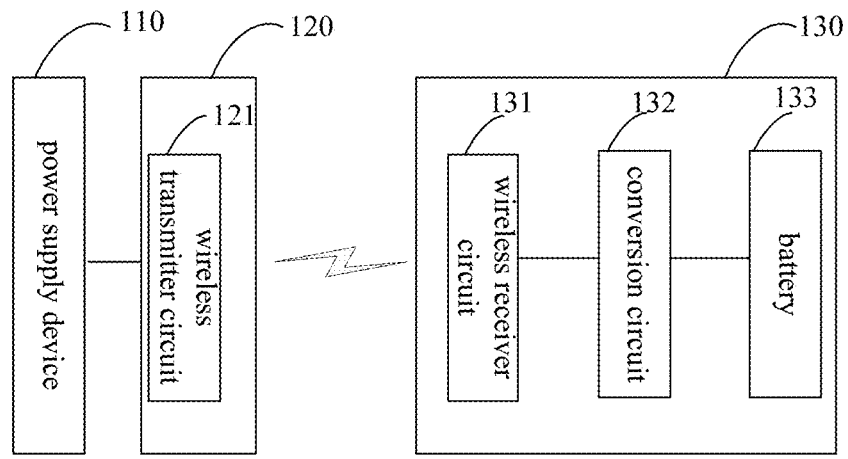
FIG. 1 is a block diagram illustrating a conventional wireless charging system.

As illustrated in FIG. 1, the wireless charging system includes a power supply device 110, a wireless charging device 120 and a device to be charged 130. The wireless charging device 120 may be, for example, a wireless charging base. The device to be charged 130 may be, for example, a terminal.

After the power supply device 110 is coupled with the wireless charging device 120, an output current of the power supply device 110 may be transmitted to the wireless charging device 120. The wireless charging device 120 may convert the output current of the power supply device 110 to an electromagnetic signal (or an electromagnetic wave) via an internal wireless transmitter circuit 121 for transmitting. For example, the wireless transmitter circuit 121 may convert the output current of the power supply device to alternating current, and convert the alternating current to the electromagnetic signal via a transmitting coil or transmitting antenna (not shown).

The device to be charged 130 may receive the electromagnetic signal transmitted by the wireless transmitter circuit 121 via the wireless receiver circuit 131, and convert the electromagnetic signal to an output current of the wireless receiver circuit 131. For example, the wireless receiver circuit 131 may convert the electromagnetic signal transmitted by the wireless transmitter circuit 121 to alternating current via a receiving coil or receiving antenna (not shown), and perform operations such as rectification and/or filtering on the alternating current to convert the alternating current to an output voltage and an output current of the wireless receiver circuit 131.

For the conventional wireless charging technology, before the wireless charging, the wireless charging device 120 and the device to be charged 130 may negotiate a transmitting power of the wireless transmitter circuit 121 in advance. Assuming that the power negotiated by the wireless charging device 120 and the device to be charged 130 is 5 W, the output voltage and the output current of the wireless receiver circuit 131 are generally 5V and 1 A. Assuming that the power negotiated by the wireless charging device 120 and the device to be charged 130 is 10.8 W, the output voltage and the output current of the wireless receiver circuit 131 are generally 9V and 1.2 A.

The output voltage of the wireless receiver circuit 131 is not suitable for being directly applied to both ends of the battery 133, and needs to be first converted by the conversion circuit 132 in the device to be charged 130, such that a charging voltage and/or a charging current expected by the battery 133 in the device to be charged 130 are obtained.

The conversion circuit 132 may be configured to convert the output voltage of the wireless receiver circuit 131, to meet a requirement of the charging voltage and/or charging current expected by the battery 133.

As an example, the conversion circuit 132 may be a charging management module, such as a charging integrated circuit (IC). During a charging process of the battery 133, the conversion circuit 132 may be configured to manage the charging voltage and/or charging current of the battery 133. The conversion circuit 132 may have at least one of a voltage feedback function and a current feedback function, so as to manage the charging voltage and/or charging current of the battery 133.

For example, the charging process of the battery may include at least one of a trickle charging stage, a constant current charging stage and a constant voltage charging stage. In the trickle charging stage, the conversion circuit 132 may utilize a current feedback loop to ensure that a current flowing into the battery 133 in the trickle charging stage meets the charging current (such as a first charging current) expected by the battery 133. In the constant current charging stage, the conversion circuit 132 may utilize a current feedback loop to ensure that the current flowing into the battery 133 in the constant current charging stage meets the charging current (such as a second charging current, which may be greater than the first charging current) expected by the battery 133. In the constant voltage charging stage, the conversion circuit 132 may utilize a voltage feedback loop to ensure that a voltage applied to both ends of the battery 133 in the constant voltage charging stage meets the charging voltage expected by the battery 133.

As an example, when the output voltage of the wireless receiver circuit 131 is greater than the charging voltage expected by the battery 133, the conversion circuit 132 may be configured to perform a buck conversion on the output voltage of the wireless receiver circuit 131 to enable a buck-converted charging voltage to meet the requirement of the charging voltage expected by the battery 133. As another example, when the output voltage of the wireless receiver circuit 131 is less than the charging voltage expected by the battery 133, the conversion circuit 132 may be configured to perform a boost conversion on the output voltage of the wireless receiver circuit 132 to enable a boost-converted charging voltage to meet the requirement of the charging voltage expected by the battery 133.

As another example, assume that the wireless receiver circuit 131 outputs a constant voltage of 5V. When the battery 133 includes a single battery cell (such as a lithium battery cell, a charging cut-off voltage of a single battery cell is typically 4.2V), the conversion circuit 132 (for example, a buck circuit) may perform a buck conversion on the output voltage of the wireless receiver circuit 131, such that the charging voltage obtained after the buck conversion meets a requirement of the charging voltage expected by the battery 133.

As yet another example, assume that the wireless receiver circuit 131 outputs a constant voltage of 5V. When the battery 133 includes two or more battery cells (such as lithium battery cell, a charging cut-off voltage of a single battery cell is typically 4.2V) coupled in series, the conversion circuit 132 (for example, a boost circuit) may perform a boost conversion on the output voltage of the wireless receiver circuit 131, such that the charging voltage obtained after the boost conversion meets a requirement of the charging voltage expected by the battery 133.

Limited by a poor conversion efficiency of the conversion circuit 132, a part of electric energy is lost in a form of heat, and the heat may gather inside the device to be charged 130. A design space and a space for heat dissipation of the device to be charged are small (for example, the physical size of a mobile terminal used by a user becomes thinner and thinner, while plenty of electronic elements are densely arranged in the mobile terminal to improve performance of the mobile terminal), which not only increases difficulty in designing the conversion circuit 132, but also results in that it is hard to dissipate the heat gathered in the device to be charged 130 in time, thus further causing an abnormity of the device to be charged 130.

For example, the heat gathered on the conversion circuit 132 may cause a thermal interference on electronic elements neighboring the conversion circuit 132, thus causing abnormal operations of the electronic elements. For another example, the heat gathered on the conversion circuit 132 may shorten the service life of the conversion circuit 132 and neighboring electronic elements. For yet another example, the heat gathered on the conversion circuit 132 may cause a thermal interference on the battery 133, thus causing abnormal charging and/or abnormal discharging of the battery 133. For still another example, the heat gathered on the conversion circuit 132 may increase the temperature of the device to be charged 130, thus affecting user experience during the charging. For still yet another example, the heat gathered on the conversion circuit 132 may short-circuit the conversion circuit 132, such that the output voltage of the wireless receiver circuit 131 is directly applied to both ends of the battery 133, thus causing abnormal charging of the battery 133, which brings safety hazard if the over-voltage charging lasts for a long time, for example, the battery 133 may explode.

In order to solve above problems, embodiments of the present disclosure provide a wireless charging system. In the wireless charging system, the wireless charging device can perform wireless communication with the device to be charged, and the transmitting power of the wireless charging device can be adjusted based on feedback information of the device to be charged, such that the output voltage and/or the output current of the wireless receiver circuit in the device to be charged can match a charging stage where the battery presently is. In other words, in the wireless charging system, the wireless charging device can perform wireless communication with the device to be charged, and the transmitting power of the wireless charging device can be adjusted based on feedback information of the device to be charged, such that the output voltage and/or the output current of the wireless receiver circuit in the device to be charged can satisfy a present charging requirement of the battery (including a present requirement of the charging voltage and/or the charging current of the battery). In this way, in the device to be charged, the output voltage and/or the output current of the wireless receiver circuit can be directly applied to both ends of the battery, for charging the battery (hereinafter, this charging mode is referred to as direct charging), thus avoiding the above-mentioned problems such as energy loss and heating caused by the conversion circuit converting the output voltage and/or the output current of the wireless receiver circuit.

In the following, the wireless charging system 200 provided by an embodiment of the present disclosure is described in detail with reference to FIG. 2.

Figure 2:
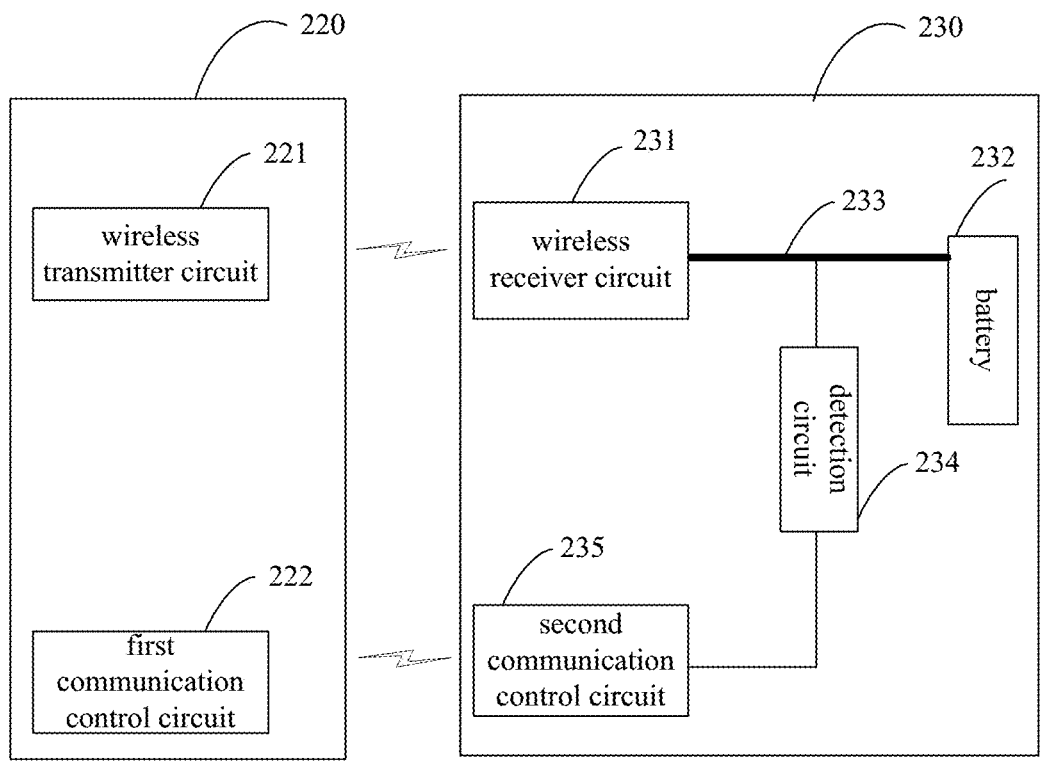
FIG. 2 is a block diagram illustrating a wireless charging system provided by an embodiment of the present disclosure.

As illustrated in FIG. 2, the wireless charging system provided by an embodiment of the present disclosure may include a wireless charging device 220 and a device to be charged 230.

The wireless charging device 220 may include a wireless transmitter circuit 221 and a first communication control circuit 222. Control functions of the first communication control circuit 222 may be implemented, for example, by a MCU (micro control unit).

The wireless transmitter circuit 221 may be configured to transmit an electromagnetic signal to perform wireless charging on the device to be charged 230. In some embodiments, the wireless transmitter circuit 221 may include a wireless transmission driver circuit and a transmitting coil or transmitting antenna (not shown). The wireless transmission driver circuit may be configured to generate higher frequency alternating current, and the transmitting coil or transmitting antenna may be configured to convert the higher frequency alternating current to the electromagnetic signal and to transmit the electromagnetic signal.

The first communication control circuit 222 may be configured to perform wireless communication with the device to be charged 230 during the wireless charging. In detail, the first communication control circuit 222 may communicate with a second communication control circuit 235 in the device to be charged 230. In embodiments of the present disclosure, a communication mode between the first communication control circuit 222 and the second communication control circuit 235 and communication information between the first communication control circuit 222 and the second communication control circuit 235 are not limited, and will be described in detail below with reference to specific embodiments.

The device to be charged 230 may include a wireless receiver circuit 231, a battery 232, a first charging channel 233, a detection circuit 234 and the second communication control circuit 235. Control functions of the second communication control circuit 235 may be implemented, for example, by a MCU (micro control unit), or may be implemented by the MCU together with an application processor in the device to be charged.

The wireless receiver circuit 231 may be configured to receive the electromagnetic signal, and to convert the electromagnetic signal to an output current and an output voltage of the wireless receiver circuit 231. In detail, the wireless receiver circuit 231 may include a receiving coil or receiving antenna (not shown), and a shaping circuit, such as a rectification circuit and/or a filtering circuit, coupled with the receiving coil or receiving antenna. The receiving coil or receiving antenna may be configured to convert the electromagnetic signal to alternating current. The shaping circuit may be configured to convert the alternating current to the output voltage and the output current of the wireless receiver circuit 231. It should be noted that, in embodiments of the present disclosure, specific forms of the shaping circuit and forms of the output current and the output voltage of the wireless receiver circuit 231 obtained after shaping of the shaping circuit are not limited. In some embodiments, the shaping circuit may include the rectification circuit and the filtering circuit, and the output voltage of the wireless receiver circuit 231 may be a stable voltage obtained after filtering. In other embodiments, the shaping circuit may include the rectification circuit, and the output voltage of the wireless receiver circuit 231 may be a voltage with a pulsating waveform obtained after rectification, in which the voltage with the pulsating waveform is directly applied to both ends of the battery 232 in the device to be charged 230 for charging the battery 232. It could be understood that, the output current of the wireless receiver circuit 231 may charge the battery 232 intermittently, and a period of the output current of the wireless receiver circuit 231 may vary with a frequency of the alternating current input into the wireless charging system 200 (for example, a frequency of the alternating current power grid). For example, a frequency corresponding to the period of the output current of the wireless receiver circuit 231 may be an integral multiple or a reciprocal multiple of the frequency of the power grid. Moreover, when the output current of the wireless receiver circuit 231 may charge the battery 232 intermittently, the current waveform corresponding to the output current of the wireless receiver circuit 231 may consist of one pulse or a set of pulses synchronous with the power grid. A magnitude of the voltage/current with the pulsating waveform changes periodically, which, compared to the conventional constant direct current, may reduce lithium precipitation of a lithium battery, and prolong a service life of the battery, and moreover may be beneficial to reduce polarization effect of the battery, improve a charging speed, and reduce heating of the battery, thus ensuring safety and reliability of charging the device to be charged.

The first charging channel 233 may be configured to receive the output current and the output voltage of the wireless receiver circuit 231, and to charge the battery 232 based on the output voltage and the output current of the wireless receiver circuit 231. The first charging channel 233 provided by an embodiment of the present disclosure may perform direct charging on the battery 232 based on the output voltage and the output current of the wireless receiver circuit 231. For example, the first charging channel 233 may be a wire. For another example, when the device to be charged 232 includes a plurality of charging channels, elements such as a switch (referring to the switch 238 in FIG. 6) may be provided on the first charging channel 233, for switching between different charging channels.

The detection circuit 234 may be configured to detect the output current and/or the output voltage of the wireless receiver circuit 231. In some embodiments, the detection circuit 234 may include a voltage detection circuit and a current detection circuit.

The voltage detection circuit may be configured to sample the output voltage of the wireless receiver circuit 231, and to transmit the sampled voltage value to the second communication control circuit 235. In some embodiments, the voltage detection circuit may sample the output voltage of the wireless receiver circuit 231 by means of voltage division using a series circuit.

The current detection circuit may be configured to sample the output current of the wireless receiver circuit 231, and to transmit the sampled current value to the second communication control circuit 235. In some embodiments, the current detection circuit may sample the output current of the wireless receiver circuit 231 by means of a current detection resistor and a galvanometer.

The second communication control circuit 235 may be configured to perform wireless communication with the first communication control circuit 222 based on the output voltage and/or the output current of the wireless receiver circuit 231 detected by the detection circuit 234, such that the first communication control circuit 222 adjusts a transmitting power of the wireless transmitter circuit 221, to enable the output voltage and/or the output current of the wireless receiver circuit 231 to match a charging stage where the battery 232 presently is.

In other words, the second communication control circuit 235 may be configured to perform wireless communication with the first communication control circuit 222 based on the output voltage and/or the output current of the wireless receiver circuit 231 detected by the detection circuit 234, such that the first communication control circuit 222 adjusts the transmitting power of the wireless transmitter circuit 221, to enable the output voltage and/or the output current of the wireless receiver circuit 231 to match a charging requirement of the battery 232 (including a requirement of a charging voltage and/or a charging current of the battery 232).

In other words, the second communication control circuit 235 may be configured to perform wireless communication with the first communication control circuit 222 based on the output voltage and/or the output current of the wireless receiver circuit 231 detected by the detection circuit 234, such that the first communication control circuit 222 adjusts the transmitting power of the wireless transmitter circuit 221, to enable the output voltage and/or the output current of the wireless receiver circuit 231 to match a charging requirement of the battery 232 in at least one stage of a trickle charging stage, a constant voltage charging stage, and a constant current charging stage.

In other words, the second communication control circuit 235 may be configured to perform wireless communication with the first communication control circuit 222 based on the output voltage and/or the output current of the wireless receiver circuit 231 detected by the detection circuit 234, such that the first communication control circuit 222 performs constant voltage and/or constant current control on a charging process of the battery 232 by adjusting the transmitting power of the wireless transmitter circuit 221.

The charging process of the battery may include at least one of the trickle charging stage, the constant current charging stage and the constant voltage charging stage.

The second communication control circuit 235 may perform wireless communication with the first communication control circuit 222 based on the output voltage and/or the output current of the wireless receiver circuit 231 detected by the detection circuit 234, such that the first communication control circuit 222 adjusts the transmitting power of the wireless transmitter circuit 221 according to the output voltage and/or the output current of the wireless receiver circuit 231 as follows. During the trickle charging stage of the battery 232, the second communication control circuit 235 performs wireless communication with the first communication control circuit 222 based on the output current and/or the output voltage of the wireless receiver circuit 231 detected by the detection circuit 234, such that the first communication control circuit 222 adjusts the transmitting power of the wireless transmitter circuit 221, to enable the output current of the wireless receiver circuit 231 to match a charging current corresponding to the trickle charging stage (or, enable the output current of the wireless receiver circuit 231 to match a requirement of the charging current of the battery 232 in the trickle charging stage).

Take the charging current corresponding to the trickle charging stage being 1 A as an example. When the battery 232 is in the trickle charging stage, the output current of the wireless receiver circuit 231 may be detected by the detection circuit 234 in real time. When the output current of the wireless receiver circuit 231 is greater than 1 A, the second communication control circuit 235 may communicate with the first communication control circuit 222, such that the first communication control circuit 222 adjusts the transmitting power of the wireless transmitter circuit 221, to enable the output current of the wireless receiver circuit 231 to return back to 1 A.

The second communication control circuit 235 may perform wireless communication with the first communication control circuit 222 based on the output voltage and/or the output current of the wireless receiver circuit 231 detected by the detection circuit 234, such that the first communication control circuit 222 adjusts the transmitting power of the wireless transmitter circuit 221 according to the output voltage and/or the output current of the wireless receiver circuit 231 as follows. During the constant voltage charging stage of the battery 232, the second communication control circuit 235 performs wireless communication with the first communication control circuit 222 based on the output voltage and/or the output current of the wireless receiver circuit 231 detected by the detection circuit 234, such that the first communication control circuit 222 adjusts the transmitting power of the wireless transmitter circuit 221, to enable the output voltage of the wireless receiver circuit 231 to match a charging voltage corresponding to the constant voltage charging stage (or, enable the output voltage of the wireless receiver circuit 231 to match a requirement of the charging voltage of the battery 232 in the constant voltage charging stage).

Take the charging voltage corresponding to the constant voltage charging stage being 5V as an example. When the battery 232 is in the constant voltage charging stage, the output voltage of the wireless receiver circuit 231 may be detected by the detection circuit in real time. When the output voltage of the wireless receiver circuit 231 is greater than 5V, the second communication control circuit 235 may communicate with the first communication control circuit 222, such that the first communication control circuit 235 adjusts the transmitting power of the wireless transmitter circuit 221, to enable the output voltage of the wireless receiver circuit 231 to return back to 5V. There may be various reasons resulting in change of the output voltage of the wireless receiver circuit 231, which will not be limited in embodiments of the present disclosure. For example, when transmission of the electromagnetic signal between the wireless transmitter circuit 221 and the wireless receiver circuit 231 is interfered, the energy conversion efficiency is reduced, thus resulting in that the output voltage of the wireless receiver circuit 231 is less than 5V.

The second communication control circuit 235 may perform wireless communication with the first communication control circuit 222 based on the output voltage and/or the output current of the wireless receiver circuit 231 detected by the detection circuit 234, such that the first communication control circuit 222 adjusts the transmitting power of the wireless transmitter circuit 221 according to the output voltage and/or the output current of the wireless receiver circuit 231 as follows. During the constant current charging stage of the battery 232, the second communication control circuit 235 performs wireless communication with the first communication control circuit 222 based on the output current and/or the output voltage of the wireless receiver circuit 231 detected by the detection circuit 234, such that the first communication control circuit 222 adjusts the transmitting power of the wireless transmitter circuit 221, to enable the output current of the wireless receiver circuit 231 to match a charging current corresponding to the constant current charging stage (or, enable the output current of the wireless receiver circuit 231 to match a requirement of the charging current of the battery 232 in the constant current charging stage).

Take the charging current corresponding to the constant current charging stage being 2 A as an example. When the battery 232 is in the constant current charging stage, the output current of the wireless receiver circuit 231 may be detected by the detection circuit in real time. When the output current of the wireless receiver circuit 231 is less than 2 A, the second communication control circuit 235 may communicate with the first communication control circuit 222, such that the first communication control circuit 222 adjusts the transmitting power of the wireless transmitter circuit 221, to enable the output current of the wireless receiver circuit 231 to return back to 2 A. There may be various reasons resulting in change of the output current of the wireless receiver circuit 231, which will not be limited in embodiments of the present disclosure. For example, when transmission of the electromagnetic signal between the wireless transmitter circuit 221 and the wireless receiver circuit 231 is interfered, the energy conversion efficiency is reduced, thus resulting in that the output current of the wireless receiver circuit 231 is less than 2 A.

It should be noted that, it is not necessary to keep the charging current completely constant during the constant current charging stage or the constant current stage involved in embodiments of the present disclosure. For example, it may refer to in general that, a peak value or a mean value of the charging current keeps constant in a certain time period. In practice, a multi-stage constant current mode is typically adopted for charging in the constant current charging stage.

The multi-stage constant current charging may include N constant current stages, where N is an integer no less than 2. The first charging stage of the multi-stage constant current charging starts with a predetermined charging current. N constant current stages in the multi-stage constant current charging are performed in sequence from the first charging stage to the $(N-1)^{th}$ charging stage. After the constant current charging is switched from one constant current stage to the next constant current stage, the peak value or mean value of the current with the pulsating waveform may be decreased. When the battery voltage reaches a charging stop voltage threshold, the constant current charging is switched from the present constant current stage to the next constant current stage. The current change between two adjacent constant current stages may be gradual, or may be in a stepped skip manner.

The device to be charged used in embodiments of the present disclosure may refer to the "terminal". The "terminal" may include, but is not limited to a device configured to receive/transmit communication signals via a wired connection (for example, public switched telephone network (PSTN), digital subscriber line (DSL) connection, digital cable connection, direct cable connection and/or another data connection/network) and/or via a wireless interface (for example, cellular network, wireless local area network (WLAN), digital TV network such as digital video broadcasting handheld (DVB-H) network, satellite network, an amplitude modulation-frequency modulation (AM-FM) broadcasting transmitter, and/or a wireless interface of another communication terminal). The communication terminal configured to communicate via the wireless interface may be referred to as "wireless communication terminal", "wireless terminal" and/or "mobile terminal". Examples of a mobile terminal include, but are not limited to a satellite phone or a cell phone, a terminal combining a cell radio phone and a personal communication system (PCS) having capability of data process, fax, and data communication, a personal digital assistant (PDA) including a radio phone, a pager, Internet/Intranet access, a web browser, a note pad & address book, a calendar and/or a global positioning system (GPS) receiver, and a common laptop and/or handheld receiver, or other electronic devices including a radio phone transceiver. In addition, the device to be charged or terminal used in embodiments of the present disclosure may further include a power bank. The power bank may receive charging from an adapter, and store the energy, for providing power for other electronic devices.

The communication mode and the communication sequence between the wireless charging device 220 and the device to be charged 230 are not limited in embodiments of the present disclosure.

In some embodiments, the wireless communication between the wireless charging device 220 and the device to be charged 230 (or, between the second communication control circuit 235 and the first communication control circuit 222) may be a unidirectional wireless communication. For example, during the wireless charging of the battery 232, the device to be charged 230 may be an initiator of the communication, and the wireless charging device 220 may be a receiver of the communication. For example, during the constant current charging stage of the battery, the device to be charged 230 may detect the charging current of the battery 232 (i.e., the output current of the wireless receiver circuit 231) in real time using the detection circuit 234, and when the charging current of the battery 232 does not match the charging stage where the battery presently is, the device to be charged 230 sends an adjustment message to the wireless charging device 220, to instruct the wireless charging device 220 to adjust the transmitting power of the wireless transmitter circuit 221.

In some embodiments, the wireless communication between the wireless charging device 220 and the device to be charged 230 (or, between the second communication control circuit 235 and the first communication control circuit 222) may be a bidirectional wireless communication. The bidirectional wireless communication generally requires that, the receiver sends a response message to the initiator after receiving the communication request initiated by the initiator. The bidirectional communication scheme may enable the communication to be safer.

The master-slave relation of the wireless charging device 220 (the first communication control circuit 222 in the wireless charging device 220) and the device to be charged 230 (the second communication control circuit 235 in the device to be charged 230) is not limited by above description of embodiments of the present disclosure. In other words, any of the wireless charging device 220 and the device to be charged 230 can be configured as the master device for initiating the bidirectional communication session, accordingly, the other one can be configured as the slave device for making a first response or a first reply to the communication initiated by the master device. As a feasible implementation, during the communication, the identities of the master device and the slave device can be determined by comparing the link states between the wireless charging device 220 and the device to be charged 230. For example, assume that the wireless link of sending messages from the wireless charging device 220 to the device to be charged 230 is the uplink, and the wireless link of sending messages from the device to be charged 230 to the wireless charging device is the downlink. If the link quality of the uplink is better, the wireless charging device 220 may be configured as the master device of the communication. If the link quality of the downlink is better, the device to be charged 230 may be configured as the master device of the communication.

The specific implementation of bidirectional communication between the wireless charging device 220 and the device to be charged 230 is not limited in embodiments of the present disclosure. In other words, any of the wireless charging device 220 and the device to be charged 230 can be configured as the master device for initiating the bidirectional communication session, accordingly, the other one can be configured as the slave device making a first response or a first reply to the communication initiated by the master device, and the master device is able to make a second response to the first response or the first reply of the slave device, and thus one negotiation process is completed between the master device and the slave device.

As an implementation, the master device is able to make a second response to the first response or the first reply made by the slave device with respect to the communication session in a manner that, the master device is able to receive the first response or the first reply made by the slave device with respect to the communication session and to make a targeted second response to the first response or the first reply.

As another implementation, the master device is able to make a second response to the first response or the first reply made by the slave device with respect to the communication session in a manner that, when the master device does not receive the first response or the first reply made by the slave device with respect to the communication session in the predetermined time period, the master device also makes the targeted second response to the first response or the first reply of the slave device.

In some embodiments, when the device to be charged 230 is configured as the master device for initiating the communication session, after the wireless charging device 220 configured as the slave device makes the first response or the first reply to the communication session initiated by the master device, it is unnecessary for the device to be charged 230 to make the targeted second response to the first response or the first reply of the wireless charging device 220, i.e., one negotiation process is regarded as completed between the wireless charging device 220 and the device to be charged 230.

In embodiments of the present disclosure, the wireless communication mode between the first communication control circuit 222 of the wireless charging device 220 and the second communication control circuit 235 of the device to be charged 230 is not limited. For example, the first communication control circuit and the second communication control circuit may perform the wireless communication based on Bluetooth, Wi-Fi (wireless fidelity) or backscatter modulation (or power load modulation).

As mentioned above, during the wireless charging, the second communication control circuit 235 may perform the wireless communication with the first communication control circuit 222 based on the output voltage and/or the output current of the wireless receiver circuit 231 detected by the detection circuit 234, such that the first communication control circuit 222 adjusts the transmitting power of the wireless transmitter circuit 221. However, in embodiments of the present disclosure, communication content between the second communication control circuit 235 and the first communication control circuit 222 is not limited.

As an example, the second communication control circuit 235 may send the output voltage and/or the output current of the wireless receiver circuit 231 detected by the detection circuit 234 to the first communication control circuit 222. Further, the second communication control circuit 235 may further send battery status information to the first communication control circuit 222, in which the battery status information includes a present electric quantity and/or a present voltage of the battery 232 in the device to be charged 230. The first communication control circuit 222 may first determine the charging stage where the battery 232 presently is according to the battery status information, and further determine a target charging voltage and/or a target charging current matching the charging stage where the battery 232 presently is. Next, the first communication control circuit 222 may compare the output voltage and/or the output current of the wireless receiver circuit 231 sent from the second communication control circuit 235 with the target charging voltage and/or the target charging current, to determine whether the output voltage and/or the output current of the wireless receiver circuit 231 match the charging stage where the battery 232 presently is. When the output voltage and/or the output current of the wireless receiver circuit 231 does not match the charging stage where the battery 232 presently is, the first communication control circuit 222 adjusts the transmitting power of the wireless transmitter circuit 221 until the output voltage and/or the output current of the wireless receiver circuit 231 match the charging stage where the battery 232 presently is.

As another example, the second communication control circuit 235 may send the adjustment message to the first communication control circuit 222, to instruct the first communication control circuit 222 to adjust the transmitting power of the wireless transmitter circuit 221. For example, the second communication control circuit 235 may instruct the first communication control circuit 222 to increase the transmitting power of the wireless transmitter circuit 221. For another example, the second communication control circuit 235 may instruct the first communication control circuit 222 to decrease the transmitting power of the wireless transmitter circuit 221. In more detail, the wireless charging device 220 may set a plurality of levels for the transmitting power of the wireless transmitter circuit 221. Every time when the first communication control circuit 222 receives the adjustment message, it adjusts the transmitting power of the wireless transmitter circuit 221 by one level until the output voltage and/or the output current of the wireless receiver circuit 231 match the charging stage where the battery 232 presently is.

Besides the above communication contents, many other communication information may be communicated between the first communication control circuit 222 and the second communication control circuit 235. In some embodiments, information used for safety protection, abnormality detection or failure processing, for example, temperature information of the battery 232, information indicating entering overvoltage protection or overcurrent protection, and power transmission efficiency information (the power transmission efficiency information may be configured to indicate a power transmission efficiency between the wireless transmitter circuit 221 and the wireless receiver circuit 231), may be communicated between the first communication control circuit 222 and the second communication control circuit 235.

For example, when the temperature of the battery 232 is too high, the first communication control circuit 222 and/or the second communication control circuit 235 may control the charging loop to enter a protection stage, for example, control the charging loop to stop the wireless charging. For another example, after the first communication control circuit 222 receives the information indicating the overvoltage protection or the overcurrent protection sent by the second communication control circuit 235, the first communication control circuit 222 may reduce the transmitting power, or control the wireless transmitter circuit 221 to stop working. For another example, after the first communication control circuit 222 receives the power transmission efficiency information sent by the second communication control circuit 235, the first communication control circuit 222 may control the wireless transmitter circuit 221 to stop working if the power transmission efficiency is lower than a preset threshold, and inform the user of this matter, for example, may display via the display screen that the power transmission efficiency is too low, or may indicate via an indicator light that the power transmission efficiency is too low, such that the user may adjust the environment of the wireless charging.

In some embodiments, other information that can be used to adjust the transmitting power of the wireless transmitter circuit 221, for example, the temperature information of the battery, the information indicating a peak value or a mean value of the output voltage and/or the output current of the wireless receiver circuit 231, and the power transmission efficiency information (the power transmission efficiency information may be configured to indicate the power transmission efficiency between the wireless transmitter circuit 221 and the wireless receiver circuit 231), may be communicated between the first communication control circuit 222 and the second communication control circuit 235.

For example, the second communication control circuit 235 may send the power transmission efficiency information to the first communication control circuit 222, and the first communication control circuit is further configured to determine an adjustment magnitude of the transmitting power of the wireless transmitter circuit 221 according to the power transmission efficiency information. In detail, if the power transmission efficiency information indicates that the power transmission efficiency between the wireless transmitter circuit 221 and the wireless receiver circuit 231 is low, the first communication control circuit 222 may increase the adjustment magnitude of the transmitting power of the wireless transmitter circuit 221, such that the transmitting power of the wireless transmitter circuit 221 may reach the target power faster.

For another example, when the wireless receiver circuit 231 outputs the voltage and/or the current with the pulsating waveform, the second communication control circuit 235 may send the information indicating the peak value or the mean value of the output voltage and/or the output current of the wireless receiver circuit 231 to the first communication control circuit 222, and the first communication control circuit 222 may determine whether the peak value or the mean value of the output voltage and/or the output current of the wireless receiver circuit 231 matches the charging stage where the battery presently is, and if not, may adjust the transmitting power of the wireless transmitter circuit 221.

For another example, the second communication control circuit 235 may send the temperature information of the battery 232 to the first communication control circuit 222, and if the temperature of the battery 232 is too high, the first communication control circuit 222 may reduce the transmitting power of the wireless transmitter circuit 221, to reduce the output current of the wireless receiver circuit 231, thus reducing the temperature of the battery 232.

Figure 3:
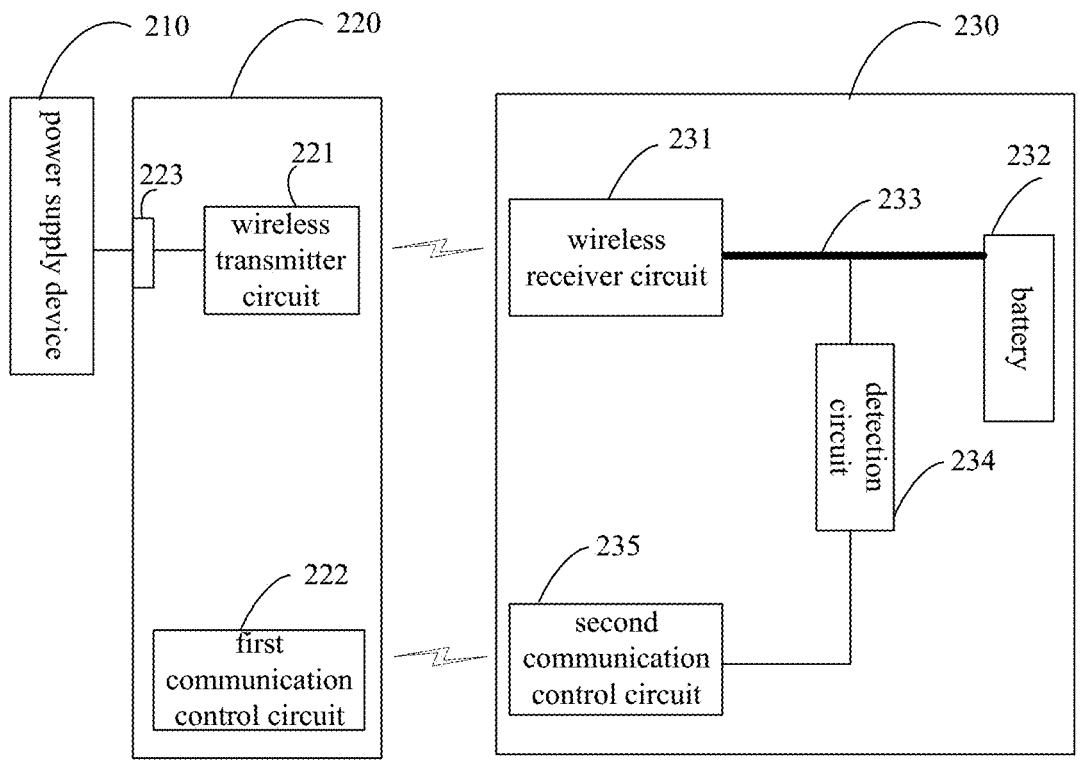
FIG. 3 is a block diagram illustrating a wireless charging system provided by another embodiment of the present disclosure.

As illustrated in FIG. 3, the wireless charging device 220 provided by an embodiment of the present disclosure may further include a charging interface 223. The wireless transmitter circuit 221 may be further configured to receive the output voltage and the output current of the power supply device 210 via the charging interface 223, and to generate the electromagnetic signal according to the output voltage and the output current of the power supply device 210.

In embodiments of the present disclosure, a type of the power supply device 210 is not limited. For example, the power supply device 210 may be an adapter, a power bank, a computer, or the like.

In embodiments of the present disclosure, a type of the charging interface 223 is not limited. In some embodiments, the charging interface 223 may be a USB interface. The USB interface may be, for example, a USB 2.0 interface, a micro USB interface, or a USB TYPE-C interface. In other embodiments, the charging interface 223 may also be a lightning interface, or any other kind of parallel interface and/or serial interface that can be used for charging.

In embodiments of the present disclosure, a communication mode between the first communication control circuit 222 and the power supply device 210 is not limited. As an example, the first communication control circuit 222 may be coupled with the power supply device 210 via a communication interface other than the charging interface, and may communicate with the power supply device 210 via the communication interface. As another example, the first communication control circuit 222 may communicate with the power supply device 210 in a wireless mode. For example, the first communication control circuit 222 may communicate with the power supply device 210 via NFC (near field communication). As yet another example, the first communication control circuit 222 may communicate with the power supply device 210 via the charging interface 223, without the need of arranging an additional communication interface or other wireless communication modes, such that an implementation of the wireless charging device 220 may be simplified. For example, the charging interface 223 is the USB interface, and the first communication control circuit 222 may communicate with the power supply device 210 based on a data wire (such as D+ and/or D− wire) of the USB interface. For another example, the charging interface 223 may be the USB interface supporting a PD (power delivery) communication protocol, and the first communication control circuit 222 may communicate with the power supply device 210 based on the PD communication protocol.

It should be understood that, the power supply device 210 may be a conventional power supply device with the constant output power, or may be a power supply device with an adjustable output power provided by embodiments of the present disclosure. A voltage feedback loop and a current feedback loop may be arranged inside the power supply device with the adjustable output power, such that it is possible to adjust the output voltage and/or the output current of the power supply device 210 according to actual demands (hereinafter, the power supply device 210 is illustrated as the power supply device with the adjustable output power). Further, the power supply device 210 may have the communication function, and the first communication control circuit 222 may be further configured to communicate with the power supply device 210 to negotiate the output power of the power supply device 210.

As noted above, in embodiments of the present disclosure, the wireless charging device 220 can adjust the transmitting power of the wireless transmitter circuit 221 constantly during the charging process, such that the output voltage and/or the output current of the wireless receiver circuit 231 match the charging stage where the battery 232 presently is. In embodiments of the present disclosure, the way of adjusting the transmitting power of the wireless transmitter circuit is not limited. For example, the first communication control circuit 222 may communicate with the power supply device 210 to adjust the output current and/or the output voltage of the power supply device 210, so as to adjust the transmitting power of the wireless transmitter circuit 221. As another example, the first communication control circuit 222 may adjust a power quantity drawn by the wireless transmitter circuit 221 from the maximum output power supplied by the power supply device 210, so as to adjust the transmitting power of the wireless transmitter circuit 221. In the following, the way of adjusting the transmitting power of the wireless transmitter circuit 221 is described in detail with reference to FIGS. 4 and 5.

Figure 4:
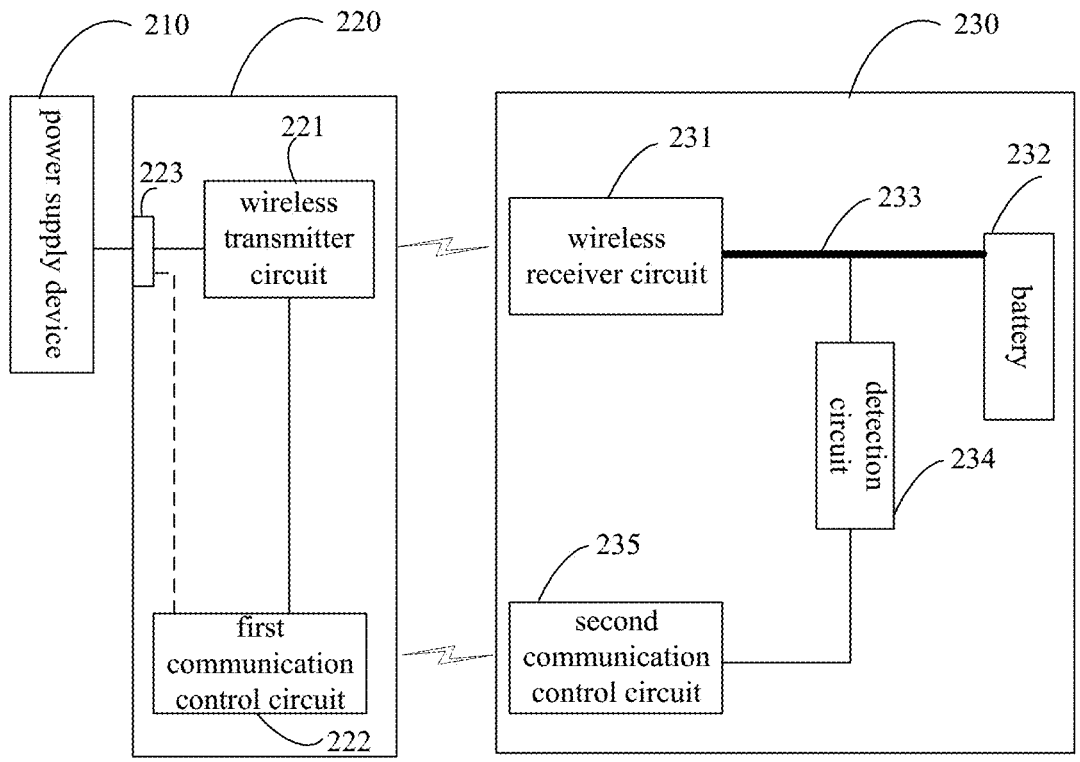
FIG. 4 is a block diagram illustrating a wireless charging system provided by yet another embodiment of the present disclosure.

As illustrated in FIG. 4, in an embodiment, the first communication control circuit 221 may communicate with the power supply device 210 to negotiate the maximum output power of the power supply device 210. During the process in which the wireless transmitter circuit 221 performs the wireless charging on the device to be charged 230 according to the maximum output power of the power supply device 210, the first communication control circuit 222 may adjust the power quantity drawn by the wireless transmitter circuit 221 from the maximum output power, to adjust the transmitting power of the wireless transmitter circuit 221.

In embodiments of the present disclosure, the first communication control circuit 222 communicates with the power supply device 210 having the adjustable output power, to negotiate the maximum output power of the power supply device 210. After the negotiation, the power supply device 210 may provide the output voltage and the output current to the wireless charging device 220 according to the maximum output power. During the charging, the first communication control circuit 222 may draw a certain power quantity from the maximum output power for wireless charging. In other words, in embodiments of the present disclosure, adjusting the transmitting power of the wireless transmitter circuit 221 is controlled by the first communication control circuit 222, which may adjust the transmitting power of the wireless transmitter circuit 221 immediately after receiving the feedback information of the device to be charged 230, having advantages of fast adjustment speed and high efficiency.

In embodiments of the present disclosure, the way in which the first communication control circuit 222 adjusts the transmitting power of the wireless transmitter circuit 221 is not limited. For example, the power adjustment circuit may be arranged inside the first communication control circuit 222, or inside the wireless transmitter circuit 221, or between the first communication control circuit 222 and the wireless transmitter circuit 221, and the power adjustment circuit may be coupled with the transmitting coil or transmitting antenna, for adjusting the power received by the transmitting coil or transmitting antenna. The power adjustment circuit may include, for example, a PWM (pulse width modulation) controller and a switch unit. The first communication control circuit 222 may adjust the transmitting power of the wireless transmitter circuit 222 by adjusting a duty ratio of a control signal sent by the PWM controller, and/or by controlling a switch frequency of the switch unit.

It should be noted that, in an embodiment as illustrated in FIG. 4, as an alternative implementation, the power supply device 210 may have the fixed and higher output power (for example, 40 W). In this way, the first communication control circuit 222 may not need to negotiate with the power supply device 210 about the maximum output power of the power supply device 210, and may directly adjust the power quantity drawn by the wireless transmitter circuit 221 from the fixed power supplied by the power supply device 210.

Figure 5:
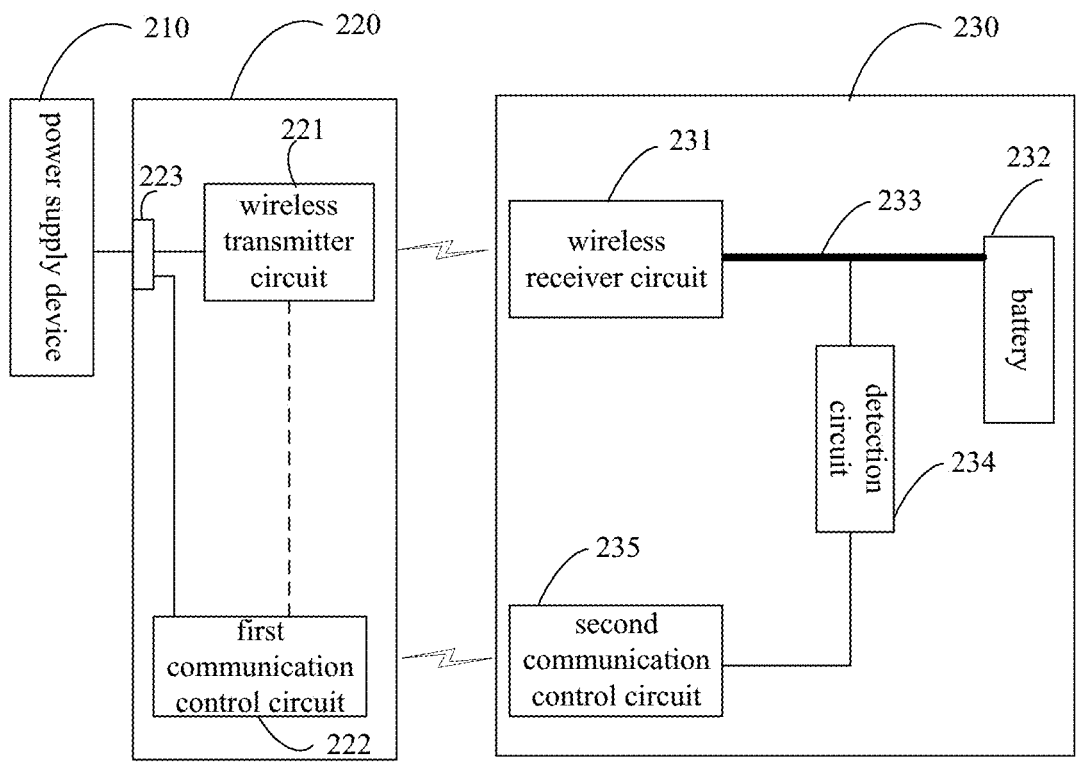
FIG. 5 is a block diagram illustrating a wireless charging system provided by still another embodiment of the present disclosure.

As illustrated in FIG. 5, in other embodiments, the first communication control circuit 222 may communicate with the power supply device 210 to adjust the output voltage and/or the output current of the power supply device 210, so as to adjust the transmitting power of the wireless transmitter circuit 221. Further, in some embodiments, the first communication control circuit 222 may be coupled with the wireless transmitter circuit 221, such that the first communication control circuit 222 may control the wireless transmitter circuit 221 to start working, or control the wireless transmitter circuit 221 to stop working when an abnormality occurs in the wireless charging. In some embodiments, the first communication control circuit 222 may be not coupled with the wireless transmitter circuit 221.

In contrast to the embodiment in FIG. 4, in the embodiment as illustrated in FIG. 5, adjusting the transmitting power of the wireless transmitter circuit 221 is controlled by the power supply device, which adjusts the transmitting power of the wireless transmitter circuit 221 by changing the output voltage and/or the output current. This way of adjusting the transmitting power is advantageous in that, the power supply device 210 may provide as much power as the wireless charging device 220 needs, thus avoiding waste of power.

In the embodiment as illustrated in FIG. 5, the wireless charging device 220 may take the initiative to determine whether there is a need to adjust the output voltage and/or the output current of the power supply device. In other embodiments, the wireless charging device 220 may act as a bridge for communication between the power supply device 210 and the device to be charged 230, and is mainly responsible for forwarding information between the two.

For example, during the wireless charging, the first communication control circuit 222 communicates with the device to be charged 230, to determine whether there is a need to adjust the output voltage and/or the output current of the power supply device 210. When there is a need to adjust the output voltage and/or the output current of the power supply device 210, the first communication control circuit 222 communicates with the power supply device 210 to instruct the power supply device 210 to adjust the output voltage and/or the output current of the power supply device 210.

For another example, during the wireless charging, the communication control circuit 222 in the wireless charging device 220 performs wireless communication with the device to be charged 230 to obtain an adjustment message, in which the adjustment message is configured to instruct adjusting the output voltage and/or the output current of the power supply device 210. The first communication control circuit 222 communicates with the power supply device 210 to send the adjustment message to the power supply device 210, such that the power supply device 210 adjusts the output voltage and/or the output current of the power supply device according to the adjustment message.

It should be understood that, similar to the communication mode between the wireless charging device 220 and the device to be charged 230, the communication between the wireless charging device (or the first communication control circuit 222) and the power supply device 210 may be the unidirectional communication, or may be the bidirectional communication, which is not limited in embodiments of the present disclosure.

It should also be understood that, the output current of the power supply device may be constant direct current, pulsating direct current or alternating current, which is not limited in embodiments of the present disclosure.

As described above, illustration is made in a case that the wireless charging device 220 is coupled with the power supply device 210 to obtain electric energy from the power supply device 210. However, embodiments of the present disclosure are not limited to this. The function similar to the adapter may be integrated in the wireless charging device 220, such that the wireless charging device 220 may directly convert the alternating current input from the external (for example, mains supply) to the electromagnetic signal. For example, the function of the adapter may be integrated in the wireless transmitter circuit 221 of the wireless charging device 220, for example, the rectification circuit, the primary filtering circuit and/or the transformer may be integrated in the wireless transmitter circuit 221. In this way, the wireless transmitter circuit 221 may be configured to receive the alternating current input from the external (for example, 220V alternating current, or the mains supply), and generate the electromagnetic signal according to the alternating current.

In embodiments of the present disclosure, the function similar to the adapter is integrated in the wireless charging device 220, such that the wireless charging device 220 does not need to obtain power from the external power supply device, which improves the integration level of the wireless charging device 220, and reduces the number of elements required for the wireless charging.

In some embodiments, the wireless charging device 220 may support a first wireless charging mode and a second wireless charging mode, in which a charging speed of the wireless charging device 220 charging the device to be charged 230 in the first wireless charging mode is greater than a charging speed of the wireless charging device 220 charging the device to be charged 230 in the second wireless charging mode. In other words, compared to the wireless charging device 220 working in the second wireless charging mode, the wireless charging device 220 working in the first wireless charging mode can fully charge the battery having the same capacity in the device to be charged 230 in a shorter time period.

The second wireless charging mode may be referred to as a normal wireless charging mode, which may be, for example, the conventional wireless charging mode based on QI standard, PMA standard or A4WP standard. The first wireless charging mode may be referred to as a fast wireless charging mode. The normal wireless charging mode may refer to the wireless charging mode in which the transmitting power of the wireless charging device 220 is relatively lower (typically, less than 15 W, and the commonly used transmitting power is 5 W or 10 W). In the normal wireless charging mode, it may take several hours to fully charge a larger capacity battery (such as a battery with 3000 mAh). In contrast, under the fast wireless charging mode, the transmitting power of the wireless charging device 220 is relatively higher (typically, greater than or equal to 15 W). Compared to the normal wireless charging mode, the charging speed of the wireless charging device 220 in the fast wireless charging mode is faster, and the charging time required for fully charging a battery with a same capacity in the fast wireless charging mode may be significantly shortened.

In some embodiments, the first communication control circuit 222 performs the bidirectional communication with the second communication control circuit 235, to control the transmitting power of the wireless charging device 220 in the first wireless charging mode.

Further, in some embodiments, the first communication control circuit 222 may perform the bidirectional communication with the second communication control circuit 235 to control the transmitting power of the wireless charging device 220 in the first wireless charging mode as follows. The first communication control circuit 222 performs the bidirectional communication with the second communication control circuit 235 to negotiate the wireless charging mode between the wireless charging device 220 and the device to be charged 230.

In detail, the first communication control circuit 222 may perform handshake communication with the second communication control circuit 235, control the wireless charging device 220 to charge the device to be charged 230 in the first wireless charging mode when the handshake communication succeeds, and control the wireless charging device 220 to charge the device to be charged 230 in the second wireless charging mode when the handshake communication fails.

The handshake communication may refer to recognize the other's identity by any of the communication parties. When the handshake communication succeeds, it indicates that both the wireless charging device 220 and the device to be charged 230 support the wireless charging mode with adjustable transmitting power provided by embodiments of the present disclosure. When the handshake communication fails, it indicates that at least one of the wireless charging device 220 and the device to be charged 230 does not support the wireless charging mode with adjustable transmitting power provided by embodiments of the present disclosure.

In embodiments of the present disclosure, the wireless charging device 220 does not perform the fast wireless charging on the device to be charged 230 in the first wireless charging mode blindly, but performs the bidirectional communication with the device to be charged 230 to negotiate whether the wireless charging device 220 can perform the fast wireless charging on the device to be charged 230 in the first wireless charging mode. In this way, safety of charging process can be improved.

In detail, the first communication control circuit 222 performs the bidirectional communication with the second communication control circuit 235 to negotiate the wireless charging mode between the wireless charging device 220 and the device to be charged 230 as follows. The first communication control circuit 222 sends a first instruction to the second communication control circuit 235, in which the first instruction is configured to query the device to be charged 230 whether to operate in the first wireless charging mode. The first communication control circuit 222 receives a reply instruction of the first instruction sent by the second communication control circuit 235, in which the reply instruction of the first instruction is configured to indicate whether the device to be charged 230 agrees to operate in the first wireless charging mode. When the device to be charged 230 agrees to operate in the first wireless charging mode, the first communication control circuit 222 controls the wireless charging device 220 to charge the device to be charged 230 in the first wireless charging mode.

Besides determining the wireless charging mode based on the negotiation, the first communication control circuit 222 may select or switch the wireless charging mode according to some other factors. For example, the first communication control circuit 222 may control the wireless charging device 220 to charge the battery 232 in the first wireless charging mode or in the second wireless charging mode according to the temperature of the battery 232.

For example, when the temperature is less than a preset threshold (for example, 5° C. or 10° C.) set in advance, the first communication control circuit 222 may control the wireless charging device 220 to perform the normal charging in the second wireless charging mode; when the temperature is greater than or equal to the first threshold, the first communication control circuit 222 may control the wireless charging device 220 to perform the fast charging in the first wireless charging mode. Further, when the temperature is greater than a high temperature threshold (for example, 50° C.), the first communication control circuit 222 may control the wireless charging device 220 to stop charging.

It should be noted that, the wireless charging mode with adjustable transmitting power provided by embodiments of the present disclosure may be used to control one or more of charging stages of the battery 232. For example, the wireless charging mode with adjustable transmitting power provided by embodiments of the present disclosure may be mainly used to control the constant current charging stage of the battery 232. In other embodiments, the device to be charged 230 may keep the conversion circuit. When the battery is in the trickle charging stage and the constant voltage charging stage, the conventional wireless charging mode as illustrated in FIG. 1 is used for charging. In detail, when the battery 232 is in the trickle charging stage and the constant voltage charging stage, the conversion circuit in the device to be charged 230 may convert the output voltage and the output current of the wireless receiver circuit 231, to make them satisfy the charging requirement of the trickle charging stage and the constant voltage charging stage. Compared to the constant current charging stage, the charging power received by the battery 232 in the trickle charging stage and the constant voltage charging stage is lower, and efficiency loss and heat accumulation of the conversion circuit in the device to be charged 230 are acceptable. Detailed description will be given below with reference to FIG. 6.

Figure 6:
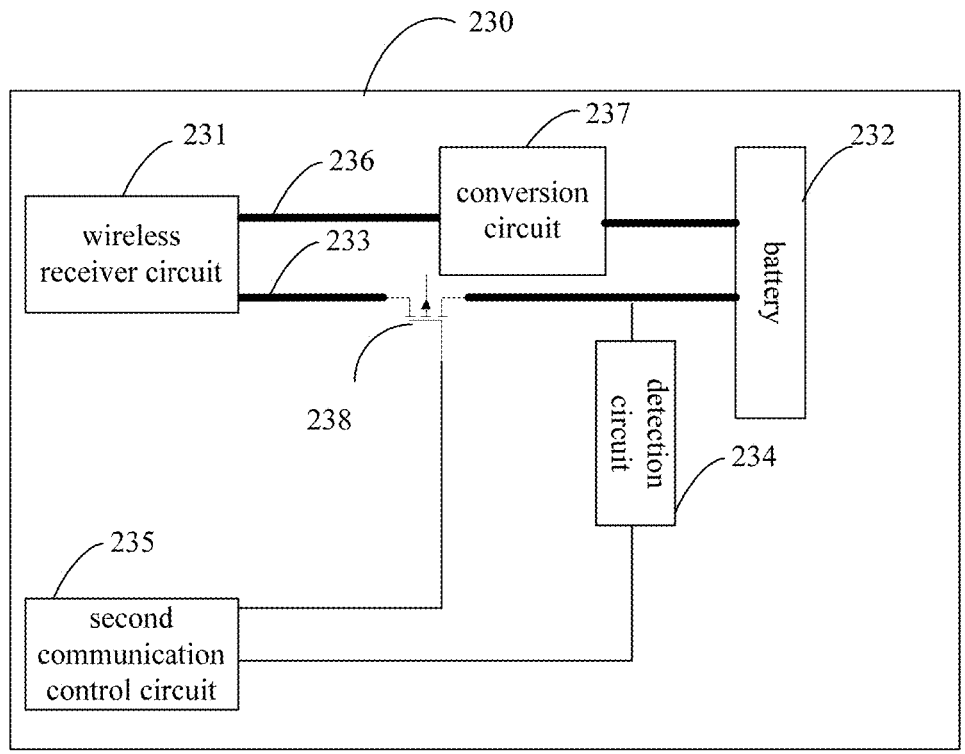
FIG. 6 is a block diagram illustrating a device to be charged provided by an embodiment of the present disclosure.

As illustrated in FIG. 6, the device to be charged 230 may further include a second charging channel 236. The conversion circuit 237 may be arranged on the second charging channel 236. The conversion circuit 237 may be configured to receive the output current of the wireless receiver circuit 231, to convert the output current of the wireless receiver circuit 231, and to charge the battery 232 based on the converted current. The second communication control circuit 235 may be further configured to control switch between the first charging channel 233 and the second charging channel 236. For example, as illustrated in FIG. 6, the first charging channel 233 may be provided with a switch 238, and the second communication control circuit 235 may control the switch between the first charging channel 233 and the second charging channel 236 by controlling the switch 238 to switch on and off.

For example, when the battery 232 is in the trickle charging stage and/or the constant voltage charging stage, the second communication control circuit 235 may control charging the battery 232 in the second charging channel 236, in which the constant voltage and constant current process of the battery may be controlled by the conversion circuit 237 (for example, a charging IC). When the battery 232 is in the constant current charging stage, the second communication control circuit 235 may control charging the battery 232 in the first charging channel 233, in which the constant current control of the battery may be implemented based on adjusting the transmitting power by the wireless charging device. Keeping the conversion circuit 237 makes it to be compatible with the conventional wireless charging mode better.

It should be noted that, there are various ways for selecting between the first charging channel 233 and the second charging channel 236, which is not limited to select based on the charging stage where the battery 232 presently is.

In some embodiments, the second communication control circuit 235 may be configured to perform handshake communication with the first communication control circuit 222, to control the first charging channel 233 to work when the handshake communication succeeds, and to control the second charging channel 236 to work when the handshake communication fails.

The handshake communication may refer to recognize the other's identity by any of the communication parties. When the handshake communication succeeds, it indicates that both the wireless charging device 220 and the device to be charged 230 support the wireless charging mode with adjustable transmitting power provided by embodiments of the present disclosure. When the handshake communication fails, it indicates that at least one of the wireless charging device 220 and the device to be charged 230 does not support the wireless charging mode with adjustable transmitting power provided by embodiments of the present disclosure. In a case that the handshake communication fails, the charging may be performed via the second charging channel 236 and the conventional wireless charging mode, such as the wireless charging mode based on QI standard may be adopted.

In other embodiments, the second communication control circuit 235 may be further configured to control the switch between the first charging channel 233 and the second charging channel 236 according to the temperature of the battery 232.

For example, when the temperature is less than a preset threshold (for example, 5° C. or 10° C.) set in advance, the second communication control circuit 235 may control performing the normal wireless charging via the second charging channel 236; when the temperature is greater than or equal to the first threshold, the second communication control circuit 235 may control performing the fast wireless charging via the first charging channel 233. Further, when the temperature is greater than a high temperature threshold (for example, 50° C.), the second communication control circuit 235 may control stopping the wireless charging.

As noted above, the output current of the wireless receiver circuit 231 may be pulsating direct current, which may reduce the lithium precipitation of the battery 232, and improve the service life of the battery. When the wireless receiver circuit 231 outputs the pulsating direct current, the peak value or the mean value of the pulsating direct current may be detected by the detection circuit 234, such that the second communication control circuit 235 may perform subsequent communication or control based on the peak value or mean value of the pulsating direct current.

Figure 7:
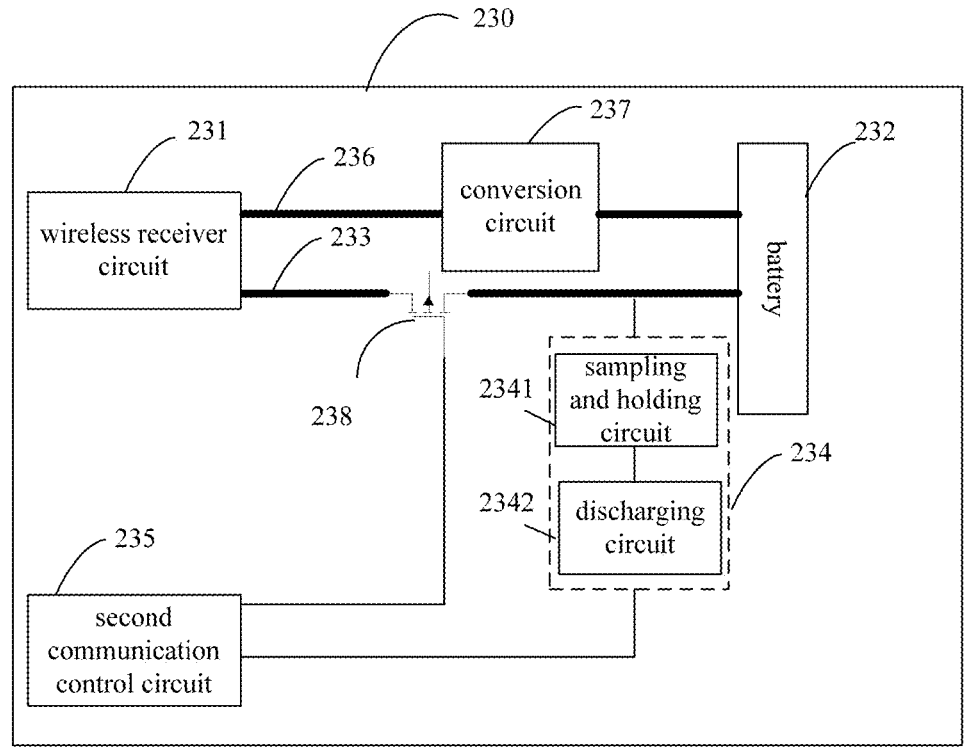
FIG. 7 is a block diagram illustrating a device to be charged provided by another embodiment of the present disclosure.

Take the detection circuit 234 detecting the peak value of the pulsating direct current as an example. As illustrated in FIG. 7, the detection circuit 234 may include a sampling and holding circuit 2341. When the sampling and holding circuit 2341 is in a sampling state, the sampling and holding circuit 2341 is configured to sample the pulsating direct current. When the sampling and holding circuit 2341 is in a holding stage, the sampling and holding circuit 2341 is configured to hold the peak current value of the pulsating direct current. The second communication control circuit 235 is further configured to determine whether the sampling and holding circuit 2341 is in the holding state, and to sample the peak current value of the pulsating direct current held by the sampling and holding circuit 2341 when determining that the sampling and holding circuit 2341 is in the holding state.

In some embodiments, the sampling and holding circuit 2341 may include a capacitor, and the sampling and holding circuit 2341 may hold the peak current value of the pulsating direct current based on the capacitor in the sampling and holding circuit 2341. The detection circuit 234 may further include a discharging circuit 2342. The second communication control circuit 235 may release charges across both ends of the capacitor in the sampling and holding circuit via the discharging circuit 2342, such that the sampling and holding circuit switches to the sampling state from the holding state.

In some embodiments, the wireless charging device 220 may further include a peripheral interface and a wireless data transmission circuit. The peripheral interface may be configured to be coupled with an electronic device having functions of data processing and transmission. The peripheral interface may be the charging interface described above, or may be other interfaces. The first communication control circuit 222 may be further configured to perform the wireless charging on the device to be charged 230 according to the output power of the electronic device when the peripheral interface is coupled with the electronic device having functions of data processing and transmission. The wireless data transmission circuit may be configured to transmit data stored in the electronic device to the device to be charged 230 via a wireless link, or transmit data stored in the device to be charged 230 to the electronic device, during the process in which the wireless charging control unit performs the wireless charging on the device to be charged 230 according to the output power of the electronic device. The wireless data transmission circuit may be configured to transmit at least one of data in a USB protocol format, data in a DP (display port) protocol format, and data in a MHL (mobile high-definition link) format.

Figure 8:
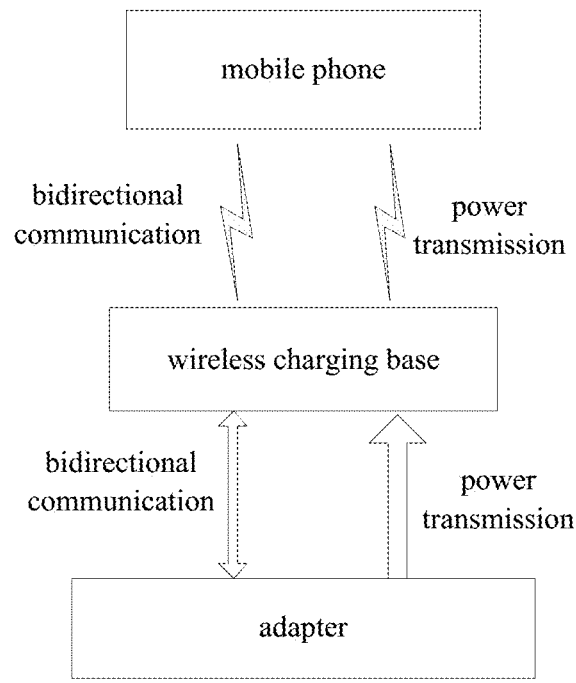
FIG. 8 is a block diagram illustrating a device to be charged provided by yet another embodiment of the present disclosure.

Embodiments of the present disclosure are described in more detail below in combination with specific examples. In FIG. 8, the wireless charging device is illustrated as a wireless charging base, the power supply device is illustrated as an adapter, and the device to be charged is illustrated as a mobile phone. It should be noted that, the example in FIG. 8 is merely illustrated for helping those skilled in the art to understand embodiments of the present disclosure, and is not intended to limit embodiments of the present disclosure to specific values or specific scenario as illustrated. Those skilled in the art may perform various equivalent modification or charge based on the example in FIG. 8, which fall in the scope of the present disclosure.

At step 1, the mobile phone performs wireless communication with the wireless charging base.

In detail, the communication protocol of the bidirectional communication between the mobile phone and the wireless charging base may be defined by manufacturers. In addition, the mobile phone and the wireless charging based may communicate with each other via Bluetooth, Wi-Fi, or backscatter modulation.

At step 2, the wireless charging base performs the wired bidirectional communication with the adapter.

In detail, the communication protocol of the bidirectional communication between the adapter and the wireless charging base may be defined by manufacturers. In addition, the wireless charging base and the adapter may communicate with each other via the USB wire (for example, via the D+ and D− data line in the USB line).

At step 3, the wireless charging base is coupled with the adapter, and communicates and shakes hands with the adapter.

In detail, after being coupled with the adapter, the wireless charging base may communicate and shake hands with the adapter, to determine the type of the adapter and the power level that can be provided by the adapter.

At step 4, the wireless charging base is coupled with the mobile phone, and communicates and shakes hands with the mobile phone.

In detail, after being coupled with the mobile phone, the wireless charging base may communicate and shake hands with the mobile phone, to determine the type of the mobile phone and the power level that can be supported by the mobile phone.

At step 5, when the wireless charging base shakes hands with the mobile phone and the adapter successfully, the wireless charging is activated.

The wireless receiver circuit in the mobile phone may perform direct charging on the battery. In order to adjust the output current or the output voltage of the wireless receiver circuit according to the charging stage where the battery presently is, the communication control circuit in the mobile phone may keep communication with the wireless charging base during the wireless charging, to instruct the wireless charging base to adjust the transmitting power of the wireless transmitter circuit in real time. For example, the communication control circuit in the mobile phone may obtain the present state of the battery in real time, and send the adjustment message to the wireless charging device based on the present state of the battery, in which the adjustment message is configured to adjust the output voltage or the output current of the adapter. After receiving the adjustment message, the wireless charging device may perform the bidirectional communication with the adapter, to instruct the adapter to adjust its output voltage and/or output current.

It should be noted that, when the wireless charging base fails to shake hands with any of the mobile phone and the adapter, the wireless charging base may perform the charging in the conventional wireless charging mode. For example, the wireless charging base may perform the wireless charging on the device to be charged with the power of 5 W based on the QI standard (5 W is corresponding to a low power level in the QI standard).

Hereinbefore, device embodiments of the present disclosure are described in detail with reference to FIGS. 2-8. Hereinafter, method embodiments of the present disclosure will be described in detail with reference to FIGS. 9-11. The method embodiments are corresponding to the device embodiments, and thus with respect to parts that are not described in detail, reference may be made to above device embodiments.

FIG. 9 is a flow chart of a wireless charging method according to an embodiment of the present disclosure. The method in FIG. 9 may be executed by a wireless charging system (for example, the wireless charging system 200 described above). The wireless charging system includes a wireless charging device and a device to be charged.

The wireless charging device includes a wireless transmitter circuit. The wireless transmitter circuit is configured to transmit an electromagnetic signal to perform wireless charging on the device to be charged.

The device to be charged includes: a battery; a wireless receiver circuit, configured to receive the electromagnetic signal, and to convert the electromagnetic signal to an output voltage and an output current of the wireless receiver circuit; a first charging channel, configured to receive the output voltage and the output current of the wireless receiver circuit, and to charge the battery based on the output voltage and the output current of the wireless receiver circuit; and a detection circuit, configured to detect the output voltage and/or the output current of the wireless receiver circuit.

The method in FIG. 9 includes, at 910, the device to be charged performing wireless communication with the wireless charging device based on the output current and/or the output voltage of the wireless receiver circuit detected by the detection circuit, such that the wireless charging device adjusts a transmitting power of the wireless transmitter circuit, to enable the output voltage and/or the output current of the wireless receiver circuit to match a charging stage where the battery presently is.

Alternatively, in some embodiments, the wireless charging device further includes a charging interface; the wireless transmitter circuit is further configured to receive an output voltage and an output current of a power supply device via the charging interface, and to generate the electromagnetic signal according to the output voltage and the output current of the power supply device.

In some embodiments, the method in FIG. 9 may further include: the wireless charging device communicating with the power supply device to negotiate an output power of the power supply device.

In some embodiments, the wireless charging device communicating with the power supply device to negotiate an output power of the power supply device may include: the wireless charging device communicating with the power supply device to negotiate a maximum output power of the power supply device; the wireless charging device adjusting the transmitting power of the wireless transmitter circuit may include: during the wireless transmitter circuit performing wireless charging on the device to be charged according to the maximum output power of the power supply device, the wireless charging device adjusting a power quantity drawn by the wireless transmitter circuit from the maximum output power to adjust the transmitting power of the wireless transmitter circuit.

In some embodiments, the wireless charging device adjusting the transmitting power of the wireless transmitter circuit may include: the wireless charging device communicating with the power supply device to adjust the output voltage and/or the output current of the power supply device, so as to adjust the transmitting power of the wireless transmitter circuit.

In some embodiments, the device to be charged performing wireless communication with the wireless charging device based on the output current and/or the output voltage of the wireless receiver circuit detected by the detection circuit, such that the wireless charging device adjusts the transmitting power of the wireless transmitter circuit, may include: the device to be charged sending an adjustment message to the wireless charging device, the adjustment message being configured to instruct the wireless charging device to adjust the output voltage and/or the output current of the power supply device.

In some embodiments, the charging stage where the battery presently is includes at least one of a trickle charging stage, a constant voltage charging stage, and a constant current charging stage.

In some embodiments, the device to be charged performing wireless communication with the wireless charging device based on the output current and/or the output voltage of the wireless receiver circuit detected by the detection circuit, such that the wireless charging device adjusts the transmitting power of the wireless transmitter circuit according to the output voltage and/or the output current of the wireless receiver circuit, may include: during the constant voltage charging stage of the battery, the device to be charged performing wireless communication with the wireless charging device based on the output voltage and/or the output current of the wireless receiver circuit detected by the detection circuit, such that the wireless charging device adjusts the transmitting power of the wireless transmitter circuit, to enable the output voltage of the wireless receiver circuit to match a charging voltage corresponding to the constant voltage charging stage.

In some embodiments, the device to be charged performing wireless communication with the wireless charging device based on the output current and/or the output voltage of the wireless receiver circuit detected by the detection circuit, such that the wireless charging device adjusts the transmitting power of the wireless transmitter circuit according to the output voltage and/or the output current of the wireless receiver circuit, may include: during the constant current charging stage of the battery, the device to be charged performing wireless communication with the wireless charging device based on the output voltage and/or the output current of the wireless receiver circuit detected by the detection circuit, such that the wireless charging device adjusts the transmitting power of the wireless transmitter circuit, to enable the output current of the wireless receiver circuit to match a charging current corresponding to the constant current charging stage.

In some embodiments, the method in FIG. 9 may further include: the device to be charged sending battery status information to the wireless charging device, such that the wireless charging device adjusts the transmitting power of the wireless transmitter circuit according to the battery status information, in which the battery status information comprises a present electric quantity and/or a present voltage of the battery in the device to be charged.

In some embodiments, communication information between the wireless charging device and the device to be charged includes at least one of: temperature information of the battery; information indicating a peak value or a mean value of the output current and/or the output voltage of the wireless receiver circuit; information indicating entering overvoltage protection or overcurrent protection; and power transmission efficiency information configured to indicate a power transmission efficiency between the wireless transmitter circuit and the wireless receiver circuit.

In some embodiments, the communication information includes the power transmission efficiency information, and the method in FIG. 9 may further include: the wireless charging device determining an adjustment magnitude of the transmitting power of the wireless transmitter circuit according to the power transmission efficiency information.

In some embodiments, the device to be charged further includes: a second charging channel, provided with a conversion circuit, in which the conversion circuit is configured to receive the output current of the wireless receiver circuit, to convert the output current of the wireless receiver circuit, and to charge the battery based on converted current. The method in FIG. 9 may further include: the device to be charged controlling switch between the first charging channel and the second charging channel.

In some embodiments, the method in FIG. 9 may further include: the device to be charged performing handshake communication with the wireless charging device, controlling the first charging channel to work when the handshake communication succeeds, and controlling the second charging channel to work when the handshake communication fails.

In some embodiments, the method in FIG. 9 may further include: the device to be charged controlling switch between the first charging channel and the second charging channel according to the temperature of the battery.

In some embodiments, the wireless charging device supports a first wireless charging mode and a second wireless charging mode, in which a charging speed of the wireless charging device charging the device to be charged in the first wireless charging mode is greater than a charging speed of the wireless charging device charging the device to be charged in the second wireless charging mode.

In some embodiments, the method in FIG. 9 may further include: the wireless charging device communicating with the device to be charged to negotiate performing the wireless charging in the first wireless charging mode or in the second wireless charging mode.

In some embodiments, the wireless charging device communicating with the device to be charged to negotiate performing the wireless charging in the first wireless charging mode or in the second wireless charging mode may include: the wireless charging device performing handshake communication with the device to be charged, controlling the wireless charging device to charge the device to be charged in the first wireless charging mode when the handshake communication succeeds, and controlling the wireless charging device to charge the device to be charged in the second wireless charging mode when the handshake communication fails.

In some embodiments, the method in FIG. 9 may further include: the wireless charging device controlling the wireless charging device to charge the battery in the first wireless charging mode or in the second wireless charging mode according to the temperature of the battery.

FIG. 10 is a flow chart of a wireless charging method according to another embodiment of the present disclosure. The method in FIG. 10 may be executed by a wireless charging device (for example, the wireless charging device 220 described above). The wireless charging device includes a wireless transmitter circuit. The wireless transmitter circuit is configured to transmit an electromagnetic signal to perform a wireless charging on a device to be charged.

The method in FIG. 10 includes, at 1010, during the wireless charging, performing wireless communication with the device to be charged to adjust a transmitting power of the wireless transmitter circuit, such that an output voltage and/or an output current of a wireless receiver circuit in the device to be charged match a charging stage in which a battery of the device to be charged presently is.

In some embodiments, the wireless charging device further includes a charging interface, and the wireless transmitter circuit is further configured to receive an output voltage and an output current of a power supply device via the charging interface, and to generate the electromagnetic signal according to the output voltage and the output current of the power supply device.

In some embodiments, the method in FIG. 10 may further include: communicating with the power supply device to negotiate an output power of the power supply device.

In some embodiments, communicating with the power supply device to negotiate the output power of the power supply device may include: communicating with the power supply device to negotiate a maximum output power of the power supply device; and adjusting the transmitting power of the wireless transmitter circuit may include: during the wireless transmitter circuit performing wireless charging on the device to be charged according to the maximum output power of the power supply device, adjusting a power quantity drawn by the wireless transmitter circuit from the maximum output power to adjust the transmitting power of the wireless transmitter circuit.

In some embodiments, adjusting the transmitting power of the wireless transmitter circuit may include: communicating with the power supply device to adjust the output voltage and/or the output current of the power supply device, so as to adjust the transmitting power of the wireless transmitter circuit.

In some embodiments, performing wireless communication with the device to be charged during the wireless charging to adjust the transmitting power of the wireless transmitter circuit may include: receiving an adjustment message sent by the device to be charged, the adjustment message being configured to instruct the wireless charging device to adjust the output voltage and/or the output current of the power supply device.

In some embodiments, the charging stage where the battery presently is includes at least one of a trickle charging stage, a constant voltage charging stage, and a constant current charging stage.

In some embodiments, performing wireless communication with the device to be charged during the wireless charging to adjust the transmitting power of the wireless transmitter circuit, such that the output voltage and/or the output current of the wireless receiver circuit in the device to be charged match the charging stage where the battery presently is, may include: during the constant voltage charging stage of the battery, performing wireless communication with the device to be charged to adjust the transmitting power of the wireless transmitter circuit, such that the output voltage of the wireless receiver circuit matches a charging voltage corresponding to the constant voltage charging stage.

In some embodiments, performing wireless communication with the device to be charged during the wireless charging to adjust the transmitting power of the wireless transmitter circuit, such that the output voltage and/or the output current of the wireless receiver circuit in the device to be charged match the charging stage where the battery presently is, may include: during the constant current charging stage of the battery, performing wireless communication with the device to be charged to adjust the transmitting power of the wireless transmitter circuit, such that the output current of the wireless receiver circuit matches a charging current corresponding to the constant current charging stage.

In some embodiments, the method in FIG. 10 may further include: receiving battery status information sent by the device to be charged, and adjusting the transmitting power of the wireless transmitter circuit according to the battery status information, in which the battery status information comprises a present electric quantity and/or a present voltage of the battery.

In some embodiments, communication information between the wireless charging device and the device to be charged includes at least one of: temperature information of the battery; information indicating a peak value or a mean value of the output current and/or the output voltage of the wireless receiver circuit; information indicating entering overvoltage protection or overcurrent protection; and power transmission efficiency information configured to indicate a power transmission efficiency between the wireless transmitter circuit and the wireless receiver circuit.

In some embodiments, the communication information includes the power transmission efficiency information, and the method in FIG. 10 may further include: determining an adjustment magnitude of the transmitting power of the wireless transmitter circuit according to the power transmission efficiency information.

In some embodiments, the wireless charging device supports a first wireless charging mode and a second wireless charging mode, in which a charging speed of the wireless charging device charging the device to be charged in the first wireless charging mode is greater than a charging speed of the wireless charging device charging the device to be charged in the second wireless charging mode.

In some embodiments, the method in FIG. 10 may further include: communicating with the device to be charged to negotiate performing the wireless charging in the first wireless charging mode or in the second wireless charging mode.

In some embodiments, communicating with the device to be charged to negotiate performing the wireless charging in the first wireless charging mode or in the second wireless charging mode may include: performing handshake communication with the device to be charged, controlling the wireless charging device to charge the device to be charged in the first wireless charging mode when the handshake communication succeeds, and controlling the wireless charging device to charge the device to be charged in the second wireless charging mode when the handshake communication fails.

In some embodiments, the method in FIG. 10 may further includes: controlling the wireless charging device to charge the battery in the first wireless charging mode or in the second wireless charging mode according to the temperature of the battery.

FIG. 11 is a flow chart of a wireless charging method according to yet another embodiment of the present disclosure. The method in FIG. 11 may be executed by a device to be charged (for example, the device to be charged 230 described above). The device to be charged includes: a battery; a wireless receiver circuit, configured to receive an electromagnetic signal transmitted by a wireless charging device, and to convert the electromagnetic signal to an output current and an output voltage of the wireless receiver circuit; a first charging channel, configured to receive the output voltage and the output current of the wireless receiver circuit, and to charge the battery based on the output voltage and the output current of the wireless receiver circuit; and a detection circuit, configured to detect the output voltage and/or the output current of the wireless receiver circuit.

The method in FIG. 11 includes: performing wireless communication with the wireless charging device based on the output voltage and/or the output current of the wireless receiver circuit detected by the detection circuit, to adjust a transmitting power of the wireless charging device, such that the output voltage and/or the output current of the wireless receiver circuit match a charging stage where the battery presently is.

In some embodiments, performing wireless communication with the wireless charging device based on the output voltage and/or the output current of the wireless receiver circuit detected by the detection circuit to adjust the transmitting power of the wireless charging device includes: sending an adjustment message to the wireless charging device, the adjustment message being configured to instruct the wireless charging device to adjust the output voltage and/or the output current of the power supply device.

In some embodiments, the charging stage where the battery presently is includes at least one of a trickle charging stage, a constant voltage charging stage, and a constant current charging stage.

In some embodiments, performing wireless communication with the wireless charging device based on the output voltage and/or the output current of the wireless receiver circuit detected by the detection circuit to adjust the transmitting power of the wireless charging device, such that the output voltage and/or the output current of the wireless receiver circuit match the charging stage where the battery presently is, may include: during the constant voltage charging stage of the battery, performing wireless communication with the wireless charging device based on the output voltage and/or the output current of the wireless receiver circuit detected by the detection circuit, to adjust the transmitting power of the wireless charging device, such that the output voltage of the wireless receiver circuit matches a charging voltage corresponding to the constant voltage charging stage.

In some embodiments, performing wireless communication with the wireless charging device based on the output voltage and/or the output current of the wireless receiver circuit detected by the detection circuit to adjust the transmitting power of the wireless charging device, such that the output voltage and/or the output current of the wireless receiver circuit match the charging stage where the battery presently is, may include: during the constant current charging stage of the battery, performing wireless communication with the wireless charging device based on the output voltage and/or the output current of the wireless receiver circuit detected by the detection circuit, to adjust the transmitting power of the wireless charging device, such that the output current of the wireless receiver circuit matches a charging current corresponding to the constant current charging stage.

In some embodiments, the method in FIG. 11 may further include: sending battery status information to the wireless charging device, such that the wireless charging device adjusts the transmitting power of the wireless transmitter circuit according to the battery status information, in which the battery status information comprises a present electric quantity and/or a present voltage of the battery in the device to be charged.

In some embodiments, communication information between the device to be charged and the wireless charging device includes at least one of: temperature information of the battery; information indicating a peak value or a mean value of the output current and/or the output voltage of the wireless receiver circuit; information indicating entering overvoltage protection or overcurrent protection; and power transmission efficiency information configured to indicate a power transmission efficiency between the wireless transmitter circuit and the wireless receiver circuit.

In some embodiments, the device to be charged further includes: a second charging channel, provided with a conversion circuit, in which the conversion circuit is configured to receive the output current of the wireless receiver circuit, to convert the output current of the wireless receiver circuit, and to charge the battery based on converted current; the method in FIG. 10 may further include: controlling switch between the first charging channel and the second charging channel.

In some embodiments, the method in FIG. 11 may further include: performing handshake communication with the wireless charging device, controlling the first charging channel to work when the handshake communication succeeds, and controlling the second charging channel to work when the handshake communication fails.

In some embodiments, the method in FIG. 11 may further include: controlling switch between the first charging channel and the second charging channel according to the temperature of the battery.

In some embodiments, the wireless charging device supports a first wireless charging mode and a second wireless charging mode, in which a charging speed of the wireless charging device charging the device to be charged in the first wireless charging mode is greater than a charging speed of the wireless charging device charging the device to be charged in the second wireless charging mode, and the method in FIG. 11 may further include communicating with the wireless charging device to negotiate performing the wireless charging in the first wireless charging mode or in the second wireless charging mode.

Figure 12:
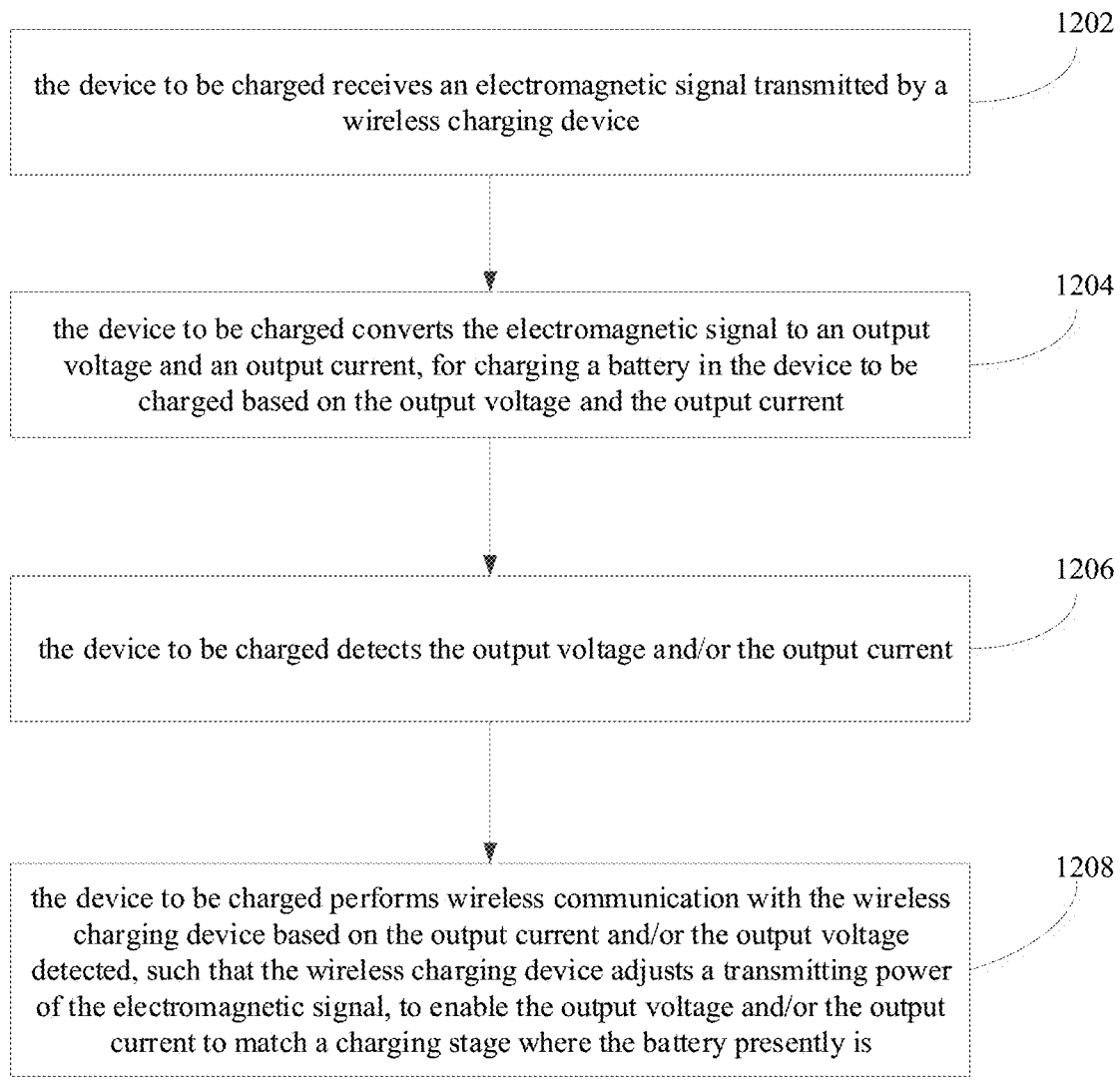
FIG. 12 is a flow chart of a wireless charging method according to embodiments of the present disclosure.

FIG. 12 is a flow chart of a wireless charging method according to embodiments of the present disclosure. The charging control method is applicable to a device to be charged. As illustrated in FIG. 12, the method includes following operations.

At block 1202, the device to be charged receives an electromagnetic signal transmitted by the wireless charging device.

At block 1204, the device to be charged converts the electromagnetic signal to an output voltage and an output current, for charging a battery in the device to be charged based on the output voltage and the output current.

At block 1206, the device to be charged detects the output voltage and/or the output current.

At block 1208, the device to be charged performs wireless communication with the wireless charging device based on the output current and/or the output voltage detected, such that the wireless charging device adjusts a transmitting power of the electromagnetic signal, to enable the output voltage and/or the output current to match a charging stage where the battery presently is.

In above embodiments, it is possible to implement the embodiments fully or partially by software, hardware, firmware or any other combination. When implemented by software, it is possible to implement the embodiments fully or partially in a form of computer program products. The computer program product includes one or more computer instructions. When the computer program instructions are loaded and executed by the computer, procedures or functions according to embodiments of the present disclosure are fully or partially generated. The computer may be a general-purpose computer, a special-purpose computer, a computer network, or any other programmable device. The computer instructions may be stored in a computer readable storage medium, or may be transmitted from one computer readable storage medium to another computer readable storage medium. For example, the computer instructions may be transmitted from one website, computer, server or data center to another website, computer, server or data center in a wired manner (for example, via coaxial cables, fiber optics, or DSL (digital subscriber line)) or in a wireless manner (for example, via infrared, Wi-Fi or microwave). The computer readable storage medium may be any available medium that are accessible by the computer, or a data storage device such as a server or a data center integrated with one or more available medium. The available medium may be magnetic medium (for example, floppy disk, hard disk and tape), optical medium (for example, DVD (digital video disc)), or semiconductor medium (for example, SSD (solid state disk)).

Those skilled in the art could be aware that, exemplary units and algorithm steps described in combination with embodiments disclosed herein may be implemented by electronic hardware, or by a combination of computer software and electronic hardware. Whether these functions are executed by hardware or software is dependent on particular use and design constraints of the technical solutions. Professionals may adopt different methods for different particular uses to implement described functions, which should not be regarded as going beyond the scope of the present disclosure.

In several embodiments provided by the present disclosure, it should be understood that, the disclosed system, device and method may be implemented in other ways. For example, the device embodiments described above are merely illustrative. For example, the units are merely divided according to logic functions, and can be divided in other ways in actual implementation. For example, a plurality of units or components may be combined or may be integrated into another system, or some features may be ignored or not executed. In addition, the mutual coupling or direct coupling or communication connection illustrated or discussed may be via some interfaces, or direct coupling or communication connection of devices or units may be in an electrical, mechanical, or other form.

Moreover, respective functional units in respective embodiments of the present disclosure may be integrated in one processing unit, or the respective units may be separate physical existence, or two or more units may be integrated in one unit.

Above description is merely specific implementation of the present disclosure. However, the protection scope of the present disclosure is not limited to this. Any change or substitute that is conceivable by those skilled in the art should be in the protection scope of the present disclosure. Thus, the protection scope of the present disclosure should be defined as the protection scope of claims.

What is claimed is:

1. A wireless charging device, comprising:
a wireless transmitter circuit, configured to transmit an electromagnetic signal to perform wireless charging on a device to be charged;
a communication control circuit, configured to perform wireless communication with the device to be charged during the wireless charging to adjust a transmitting power of the wireless transmitter circuit, such that an output voltage and/or an output current of a wireless receiver circuit in the device to be charged match a charging stage in which a battery of the device to be charged is presently is;
wherein, the communication control circuit is configured to receive one of the following:
battery status information from the device to be charged, to determine the charging stage according to the battery status information, and to obtain a present requirement of the charging voltage and/or the charging current of the battery in the charging stage, to receive a current output voltage and/or a current output current of the wireless receiver circuit from the device to be charged, and to adjust the transmitting power of the wireless transmitter circuit based on the present requirement of the charging voltage and/or the charging current of the battery and the current output voltage and/or the current output current; and
an adjustment message from the device to be charged, and to adjust the transmitting power of the wireless transmitter circuit based on the adjustment message, the adjustment message being generated by the device to be charged when the output voltage and/or the output current of the wireless receiver circuit do not arrive a present requirement of the charging voltage and/or the charging current of the battery in the charging stage.

2. The wireless charging device according to claim 1, further comprising a charging interface,
wherein the wireless transmitter circuit is further configured to receive an output voltage and an output current of a power supply device via the charging interface, and to generate the electromagnetic signal based on the output voltage and the output current of the power supply device.

3. The wireless charging device according to claim 2, wherein the communication control circuit is configured to:
communicate with the power supply device to negotiate a maximum output power of the power supply device; and
during the wireless transmitter circuit performing wireless charging on the device to be charged according to the maximum output power of the power supply device, adjust a power quantity drawn by the wireless transmitter circuit from the maximum output power to adjust the transmitting power of the wireless transmitter circuit.

4. The wireless charging device according to claim 2, wherein the communication control circuit is configured to:
communicate with the power supply device to adjust the output voltage and/or the output current of the power supply device, so as to adjust the transmitting power of the wireless transmitter circuit.

5. The wireless charging device according to claim 4, wherein the communication control circuit is configured to:
receive an adjustment message sent by the device to be charged, the adjustment message being configured to instruct the communication control circuit to adjust the output voltage and/or the output current of the power supply device.

6. The wireless charging device according to claim 2, wherein the communication control circuit is further configured to communicate with the power supply device to negotiate an output power of the power supply device, and wherein the communication between the communication control circuit and the power supply device is bidirectional communication.

7. The wireless charging device according to claim 2, wherein the charging interface is the USB interface, and the communication control circuit and the power supply device communicate with each other based on a data wire in the USB interface; or
wherein the charging interface is a USB interface supporting a power delivery PD communication protocol, and the communication control circuit and the power supply device communicate with each other based on the PD communication protocol.

8. The wireless charging device according to claim 2, wherein the output current of the power supply device is constant direct current, pulsating direct current or alternating current;
wherein the power supply device is an adapter, a power bank or a computer;
wherein the wireless charging device is a wireless charging base;
wherein the charging stage where the battery is presently is comprises at least one of a trickle charging stage, a constant voltage charging stage, and a constant current charging stage.

9. The wireless charging device according to claim 1, wherein the communication control circuit is configured to:
during the constant voltage charging stage of the battery, perform wireless communication with the device to be charged to adjust the transmitting power of the wireless transmitter circuit, such that the output voltage of the wireless receiver circuit matches a charging voltage corresponding to the constant voltage charging stage; and
during the constant current charging stage of the battery, perform wireless communication with the device to be charged to adjust the transmitting power of the wireless transmitter circuit, such that the output current of the wireless receiver circuit matches a charging current corresponding to the constant current charging stage.

10. The wireless charging device according to claim 1, wherein the wireless transmitter circuit is further configured to receive alternating current input from external, and to generate the electromagnetic signal according to the alternating current.

11. The wireless charging device according to claim 1, wherein the communication circuit is further configured to receive battery status information sent by the device to be charged, to adjust the transmitting power of the wireless transmitter circuit according to the battery status information, in which the battery status information comprises a present electric quantity and/or a present voltage of the battery.

12. The wireless charging device according to claim 1, wherein the wireless communication between the communication control circuit and the device to be charged is bidirectional wireless communication;
wherein the communication control circuit is configured to perform the wireless communication with the device to be charged based on Bluetooth, WiFi or backscatter modulation.

13. The wireless charging device according to claim 1, wherein communication information between the communication control circuit and the device to be charged comprises at least one of:
temperature information of the battery;
information indicating a peak value or a mean value of the output current and/or the output voltage of the wireless receiver circuit;
information indicating entering overvoltage protection or overcurrent protection; and
power transmission efficiency information configured to indicate a power transmission efficiency between the wireless transmitter circuit and the wireless receiver circuit.

14. The wireless charging device according to claim 13, wherein the communication information comprises the power transmission efficiency information, and the communication control circuit is further configured to determine an adjustment magnitude of the transmitting power of the wireless transmitter circuit according to the power transmission efficiency information.

15. The wireless charging device according to claim 1, wherein the wireless charging device supports a first wireless charging mode and a second wireless charging mode, in which a charging speed of the wireless charging device charging the device to be charged in the first wireless charging mode is greater than a charging speed of the wireless charging device charging the device to be charged in the second wireless charging mode;
wherein the communication control circuit is configured to communicate with the device to be charged to negotiate performing the wireless charging in the first wireless charging mode or in the second wireless charging mode.

16. A device to be charged, comprising:
a battery;
a wireless receiver circuit, configured to receive an electromagnetic signal transmitted by a wireless charging device, and to convert the electromagnetic signal to an output current and an output voltage of the wireless receiver circuit;
a first charging channel, provided without a conversion circuit for converting the output current of the wireless receiver circuit, and configured to receive the output voltage and the output current of the wireless receiver circuit, and to charge the battery based on the output voltage and the output current of the wireless receiver circuit;
a detection circuit, configured to detect the output voltage and/or the output current of the wireless receiver circuit; and
a communication control circuit, configured to perform wireless communication with the wireless charging device based on the output voltage and/or the output current of the wireless receiver circuit detected by the detection circuit, to adjust a transmitting power of the wireless charging device, such that the output voltage and/or the output current of the wireless receiver circuit match a charging stage where the battery is presently is, and the output voltage and/or the output current of the wireless receiver circuit is directly applied to both ends of the battery through the first charging channel.

17. The device to be charged according to claim 16, wherein the communication control circuit is configured to:
send an adjustment message to the wireless charging device, the adjustment message being configured to instruct the wireless charging device to adjust an output voltage and/or an output current of a power supply device.

18. The device to be charged according to claim 16, wherein the communication control circuit is configured to:
during the constant voltage charging stage of the battery, perform wireless communication with the wireless charging device based on the output voltage and/or the output current of the wireless receiver circuit detected by the detection circuit, to adjust the transmitting power of the wireless charging device, such that the output voltage of the wireless receiver circuit matches a charging voltage corresponding to the constant voltage charging stage; and
during the constant current charging stage of the battery, perform wireless communication with the wireless charging device based on the output voltage and/or the output current of the wireless receiver circuit detected by the detection circuit, to adjust the transmitting power of the wireless charging device, such that the output current of the wireless receiver circuit matches a charging current corresponding to the constant current charging stage.

19. The device to be charged according to claim 16, wherein the communication control circuit is further configured to send battery status information to the wireless charging device, such that the wireless charging device adjusts the transmitting power of the wireless transmitter circuit according to the battery status information, in which the battery status information comprises a present electric quantity and/or a present voltage of the battery in the device to be charged.

20. The device to be charged according to claim 16, wherein the wireless communication between the communication control circuit and the wireless charging device is bidirectional wireless communication;
wherein the communication control circuit is configured to perform wireless communication with the wireless charging device based on Bluetooth, WiFi or backscatter modulation.

21. The device to be charged according to claim 16, wherein communication information between the communication control circuit and the wireless charging device comprises at least one of:
temperature information of the battery;
information indicating a peak value or a mean value of the output current and/or the output voltage of the wireless receiver circuit;
information indicating entering overvoltage protection or overcurrent protection; and
power transmission efficiency information configured to indicate a power transmission efficiency between the wireless transmitter circuit and the wireless receiver circuit.

22. The device to be charged according to claim 16, wherein the device to be charged further comprises:
a second charging channel, provided with a conversion circuit, in which the conversion circuit is configured to receive the output current of the wireless receiver circuit, to convert the output current of the wireless receiver circuit, and to charge the battery based on converted current,
the communication control circuit is further configured to control switch between the first charging channel and the second charging channel.

23. The device to be charged according to claim 22, wherein the communication control circuit is further configured to perform handshake communication with the wireless charging device, to control the first charging channel to work when the handshake communication succeeds, and to control the second charging channel to work when the handshake communication fails.

24. The device to be charged according to claim 16, wherein the output current of the wireless receiver circuit is the pulsating direct current,
wherein the detection circuit comprises:
a sampling and holding circuit, configured to sample the pulsating direct current in a sampling state, and to hold a peak current value of the pulsating direct current in a holding state,
wherein the second communication control circuit is further configured to determine whether the sampling and holding circuit is in the holding state, and to sample the peak current value of the pulsating direct current hold by the sampling and holding circuit when determining that the sampling and holding circuit is in the holding state,
wherein the sampling and holding circuit comprises a capacitor, the sampling and holding circuit is configured to hold the peak current value of the pulsating direct current based on the capacitor in the sampling and holding circuit,
wherein the detection circuit further comprises a discharging circuit, the second communication control circuit is further configured to release charges across both ends of the capacitor in the sampling and holding circuit via the discharging circuit, such that the sampling and holding circuit switches to the sampling state from the holding state.

25. A wireless charging method, applicable to a device to be charged, and comprising:
receiving an electromagnetic signal transmitted by a wireless charging device;
converting the electromagnetic signal to an output voltage and an output current, for charging a battery in the device to be charged based on the output voltage and the output current;
detecting the output voltage and/or the output current;
performing wireless communication with the wireless charging device based on the output current and/or the output voltage detected, such that the wireless charging device adjusts a transmitting power of the electromagnetic signal, to enable the output voltage and/or the output current to match a charging stage where the battery is presently is, and the output voltage and/or the output current of the wireless receiver circuit is directly applied to both ends of the battery through a first charging channel in the device to be charged, wherein the device to be charged is provided without a conversion circuit.

* * * * *